US010299242B2

(12) United States Patent
Lashkarian et al.

(10) Patent No.: US 10,299,242 B2
(45) Date of Patent: May 21, 2019

(54) ESTIMATION OF INCIDENCE ANGLES IN PHASED ANTENNA ARRAYS

(71) Applicant: Apple Inc., Cupertino, CA (US)

(72) Inventors: Navid Lashkarian, Pleasanton, CA (US); Marcellus D. Forbes, Berkeley, CA (US); Ling Su, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/811,115

(22) Filed: Nov. 13, 2017

(65) Prior Publication Data
US 2018/0227878 A1 Aug. 9, 2018

Related U.S. Application Data

(60) Provisional application No. 62/454,333, filed on Feb. 3, 2017.

(51) Int. Cl.
*H04W 64/00* (2009.01)
*H01Q 3/26* (2006.01)
*G01S 3/14* (2006.01)
*H04B 17/309* (2015.01)
*H04B 7/06* (2006.01)
*H01Q 3/24* (2006.01)
*H01Q 3/36* (2006.01)
*H01Q 21/06* (2006.01)

(52) U.S. Cl.
CPC ........... *H04W 64/003* (2013.01); *G01S 3/143* (2013.01); *H01Q 3/2605* (2013.01); *H04B 17/309* (2015.01); *H01Q 3/24* (2013.01); *H01Q 3/2658* (2013.01); *H01Q 3/36* (2013.01); *H01Q 21/061* (2013.01); *H04B 7/0617* (2013.01)

(58) Field of Classification Search
CPC ... H04W 64/003; H04W 16/28; H04W 24/10; H04W 28/04; H04B 7/0617
See application file for complete search history.

(56) References Cited

U.S. PATENT DOCUMENTS

2016/0011292 A1* 1/2016 Li ............................ G01S 3/28
342/359

FOREIGN PATENT DOCUMENTS

EP 2919031 A2 9/2015
WO 2012156570 A1 11/2012

OTHER PUBLICATIONS

Hampicke D., et al.; "A Novel Antenna Concept for Double-Directional Channel Measurements"; IEEE Transaction on Vehicular Technology, vol. 63, No. 2, Mar. 1, 2004, pp. 527-537 (XP011109383, ISSN: 0018-9545).

(Continued)

*Primary Examiner* — Shukri Taha
(74) *Attorney, Agent, or Firm* — Fletcher Yoder PC

(57) ABSTRACT

The representative embodiments discussed in the present disclosure relate to techniques in which the transmission and reception of phase array antennas may be measured to more accurately and more efficiently estimate incidence angles of the associated RF signals. More specifically, in some embodiments, RF signals may be transmitted and received by various subsets of antennas in a pair of phased antenna arrays, and the resulting signals may adaptively filtered and fed back to perform iterations until incidence angles may be accurately determined.

20 Claims, 22 Drawing Sheets

(56) References Cited

OTHER PUBLICATIONS

Jiang Hong, et al.; "Joing DOD and DOA Estimation for Bistatic MIMO Radar in Unknown Correlated Noise", IEEE Transactions on Vehicular Technology, vol. 64, No. 11, Nov. 1, 2015, pp. 5113-5125 (XP011589412, ISSN:0018-9545).
Wu Zihui et al.; "Two-Dimensional Direction-of-Arrival Estimation for Co-Prime Planar Arrays: A partial Spectral Search Approach", IEEE Sensors Journal, vol. 16, No. 14, Jul. 1, 2016, pp. 5660-5670 (XP011614602, ISSN:1530-437X).
International Search Report and Written Opinion for PCT Application No. PCT/US2018/014540 dated Apr. 24, 2018; 13 pgs.

* cited by examiner

US 10,299,242 B2

ESTIMATION OF INCIDENCE ANGLES IN PHASED ANTENNA ARRAYS

CROSS-REFERENCE TO RELATED APPLICATIONS

This application is a Non-Provisional Application claiming priority to U.S. Provisional Patent Application No. 62/454,333, entitled "OPTIMUM DESIGN OF BEAMFORMING CODEBOOK FOR SWITCHED PHASE ANTENNAS," filed Feb. 3, 2017, which is herein incorporated in its entirety for all purposes.

BACKGROUND

The present disclosure relates generally to cellular and wireless devices, and more particularly, to cellular and wireless devices having phased antenna arrays.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers, or when coupled together as part of a single unit, transceivers, are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transceivers, known as wireless transceivers, may be used to generate and receive wireless signals to be transmitted and/or received by way of an antenna coupled to the transceiver. Specifically, the wireless transceiver is generally used to wirelessly communicate data over a network channel or other medium (e.g., air) to and from one or more external wireless devices.

Such wireless transceivers typically utilize one or more antennas to transmit and receive radio frequency (RF) signals. A single antenna is relatively limited in the manner in which it can transmit and receive RF signals. However, as the number of antennas increase, additional functionality may be realized. For example, certain techniques may be utilized to determine incidence angles, e.g., angle of departure (AoD) and angle of arrival (AoA), for dual antenna arrays, but dual antenna arrays are still quite limited in their beamforming capabilities. To provide higher gain and more efficient antennas having better beamforming characteristics, an array of two or more antennas may be operated as a phased array in which the array is electronically scanned to create a beam of radio waves that can be electronically steered to essentially point in different directions without actually moving the antennas. While the phased array may be linear, most phased antennas arrays are constructed as planar arrays in which a matrix of antennas (e.g., two-by-two, three-by-three, four-by-four, five-by-five, etc.) are provided in substantially the same plane. In a phased antenna array, the RF signal from the transmitter is fed to the individual antennas with the correct respective phase relationships so that the RF signals from the separate antennas add together to increase the amount of radiation in a desired direction and, similarly, subtract from one another to decrease radiation in an undesired directions, thus leading to better beamforming or directionality of the antenna array.

While relatively small antenna arrays (e.g., two-by-two arrays and three-by-three arrays) may be relatively easy to control and to determine certain characteristics of the RF signal, such as the incidence angles, the complexity of determining antenna characteristics, such as the proper phase for each individual antenna relative to the other antennas, incidence angles, etc., increases dramatically as the antenna arrays become larger. As a result, the computational ability of the associated transceivers and electronic devices similarly increases, thus leading to larger and more expensive devices that tend to have higher power consumption.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The representative embodiments discussed in the present disclosure relate to techniques in which the transmission and reception of phase array antennas may be measured to more accurately and more efficiently estimate incidence angles of the associated RF signals. More specifically, in some embodiments, RF signals may be transmitted and received by various subsets of antennas in a pair of phased antenna arrays, and the resulting signals may adaptively filtered and fed back to perform iterations until incidence angles may be accurately determined.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
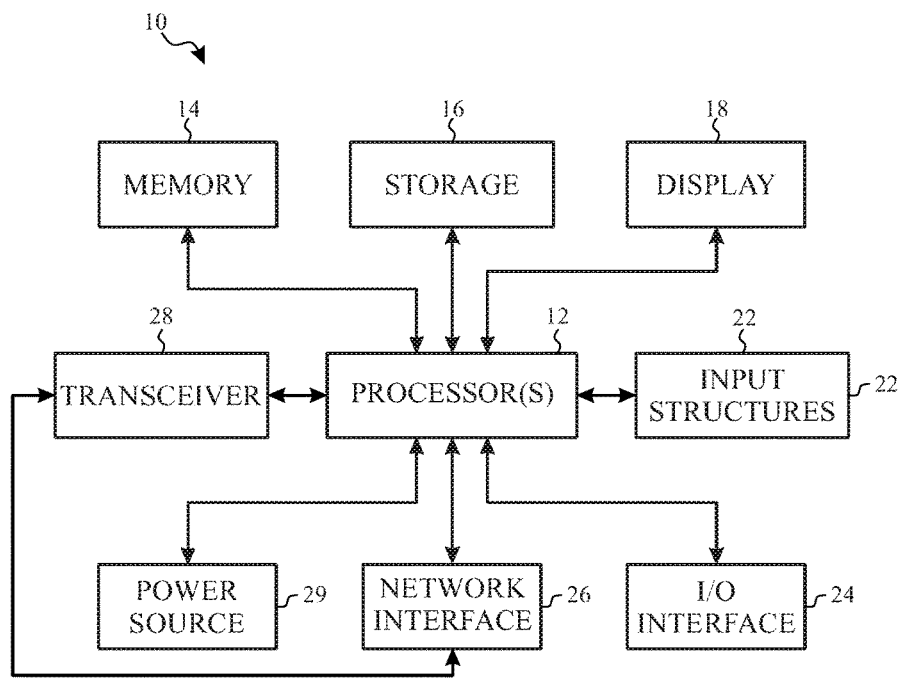
FIG. 1 is a schematic block diagram of an electronic device including a transceiver, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Given a pair of TX/RX phased antenna arrays that are steered toward known directions, the challenge is to estimate the transmitter and receiver in incidence angles, e.g., angle of arrival (AoA) and angle of departures (AoD), for all the collectors in between. Such an estimation may be useful in determining device position, orientation, location, beamforming during transmission, beam tracking during reception, and calibration, for example. It may also be useful in avoiding interference in multi-user scenarios, since interference from other users may be taken into consideration during calibration, for instance.

However, as explained in greater detail below, the simultaneous estimation of angles of incidence for transmission and reception results in a non-linear function of six unknown parameters, i.e., transmission elevation angle, transmission azimuth angle, receive elevation angle, receive azimuth angle, and complex numbers for magnitude and phase of every transmission and arrival. To address this issue, the techniques described herein activate a subset of the antennas in the transmission array and in the receive array to perform a measurement, and multiple measurements are performed by activating different subsets in the transmission and receive arrays. Each measurement is fed back to perform iterations, using an adaptive filter for example, until a zero crossing of the function is found. In other words, the multiple measurements done in such an iterative manner drive the error for the transmission incidence angles and the receive incidence angles to zero, thus providing an accurate indication of the actual incidence angles for both the transmit array and the receive array.

With the foregoing in mind, a general description of suitable electronic devices that may employ a transceiver useful in transmitting and receiving wireless data signals via a phased antenna array will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
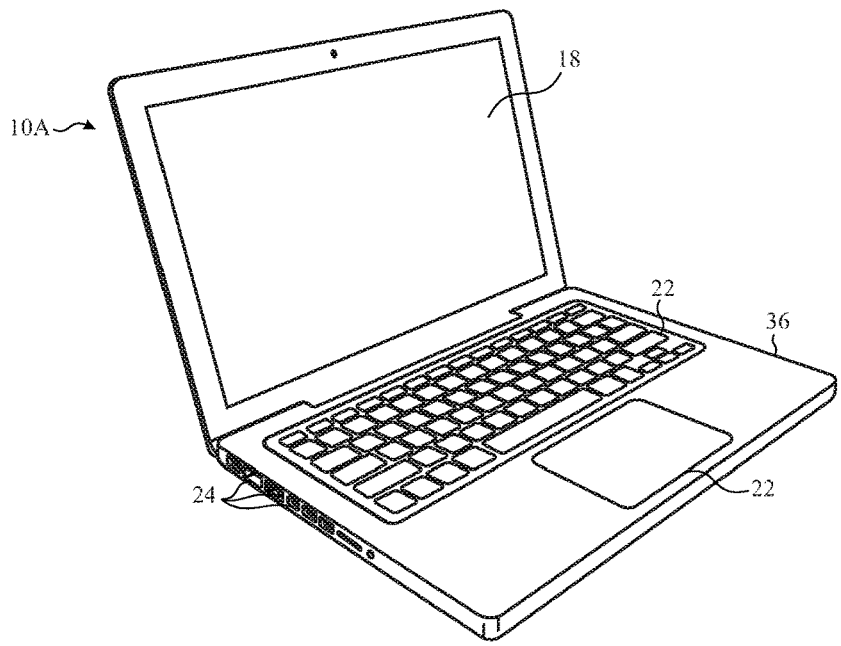
FIG. 2 is a perspective view of a notebook computer representing an embodiment of the electronic device of FIG. 1.
Figure 3:
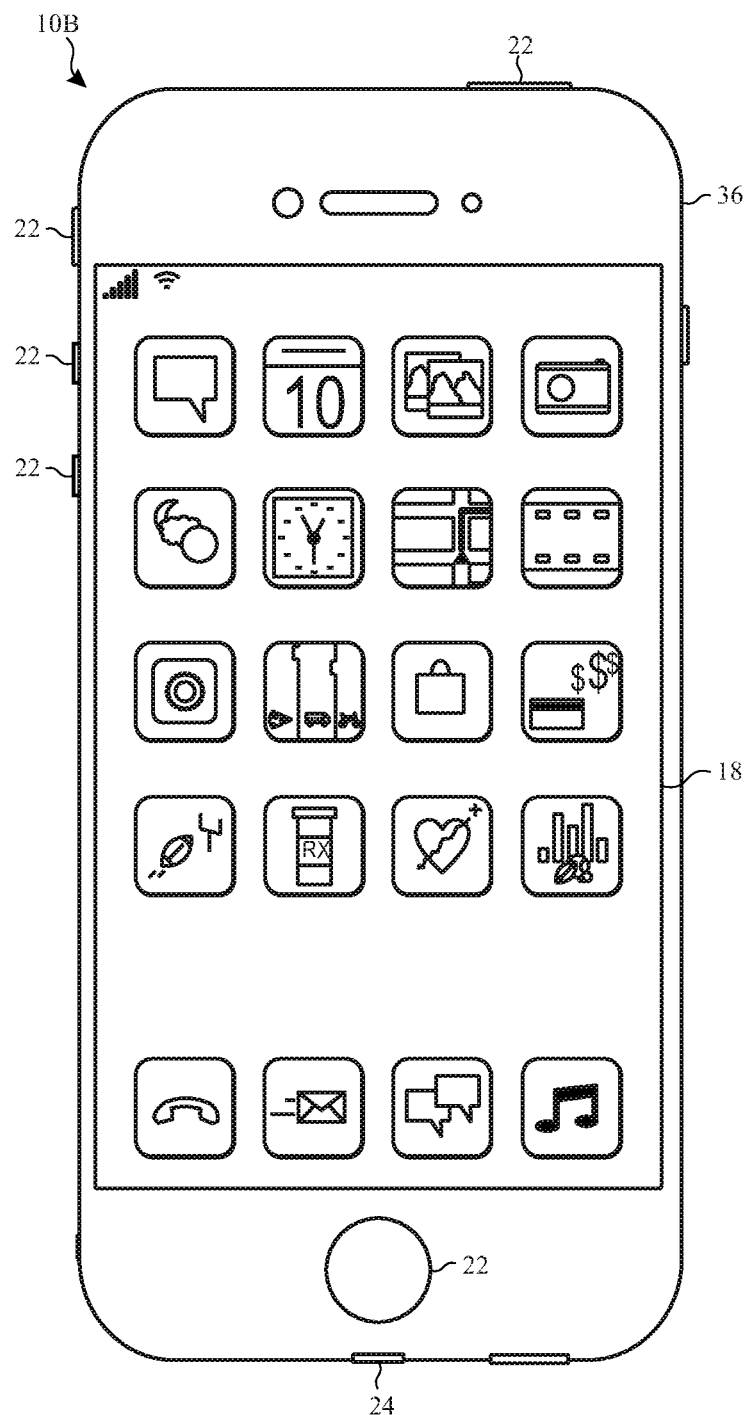
FIG. 3 is a front view of a hand-held device representing another embodiment of the electronic device of FIG. 1.
Figure 4:
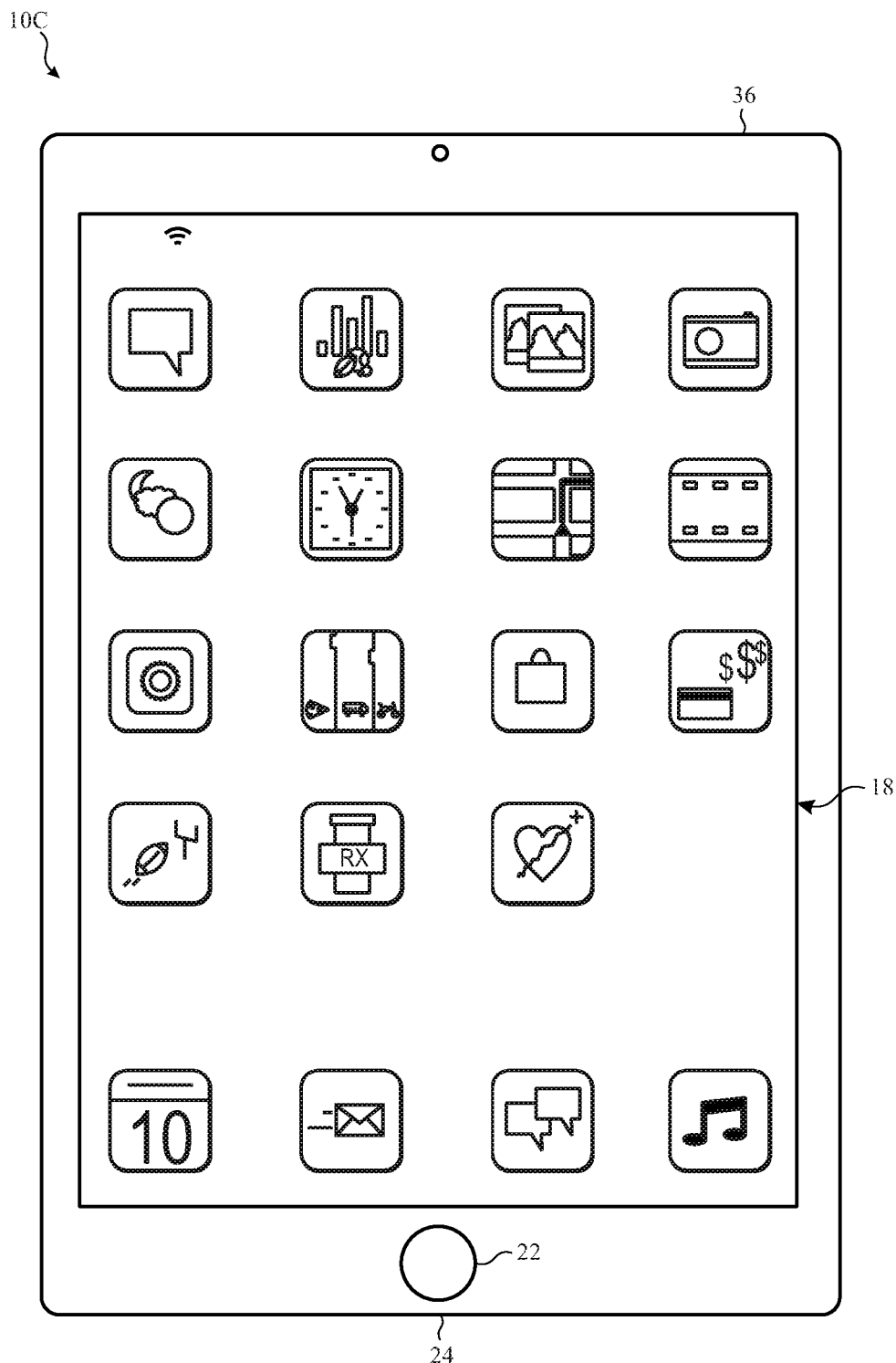
FIG. 4 is a front view of another hand-held device representing another embodiment of the electronic device of FIG. 1.
Figure 5:
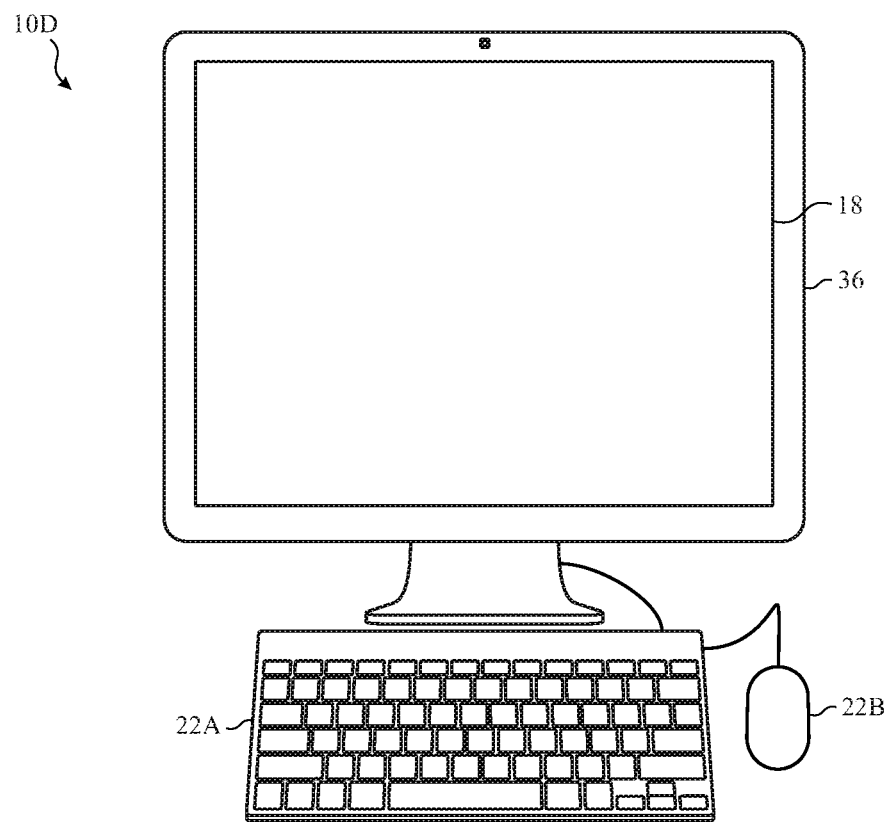
FIG. 5 is a front view of a desktop computer representing another embodiment of the electronic device of FIG. 1.
Figure 6:
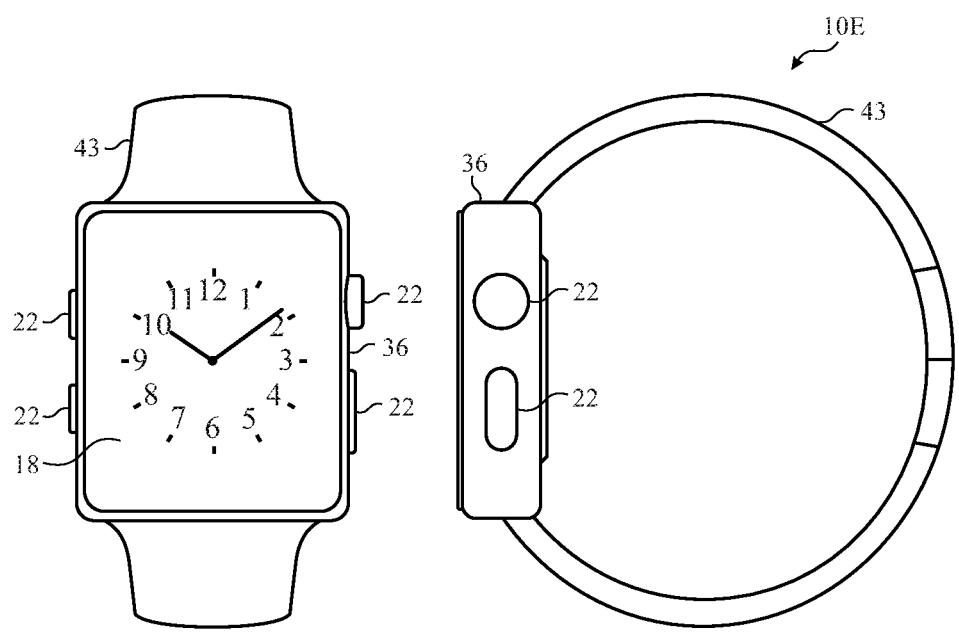
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, $4^{th}$ generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28.

The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
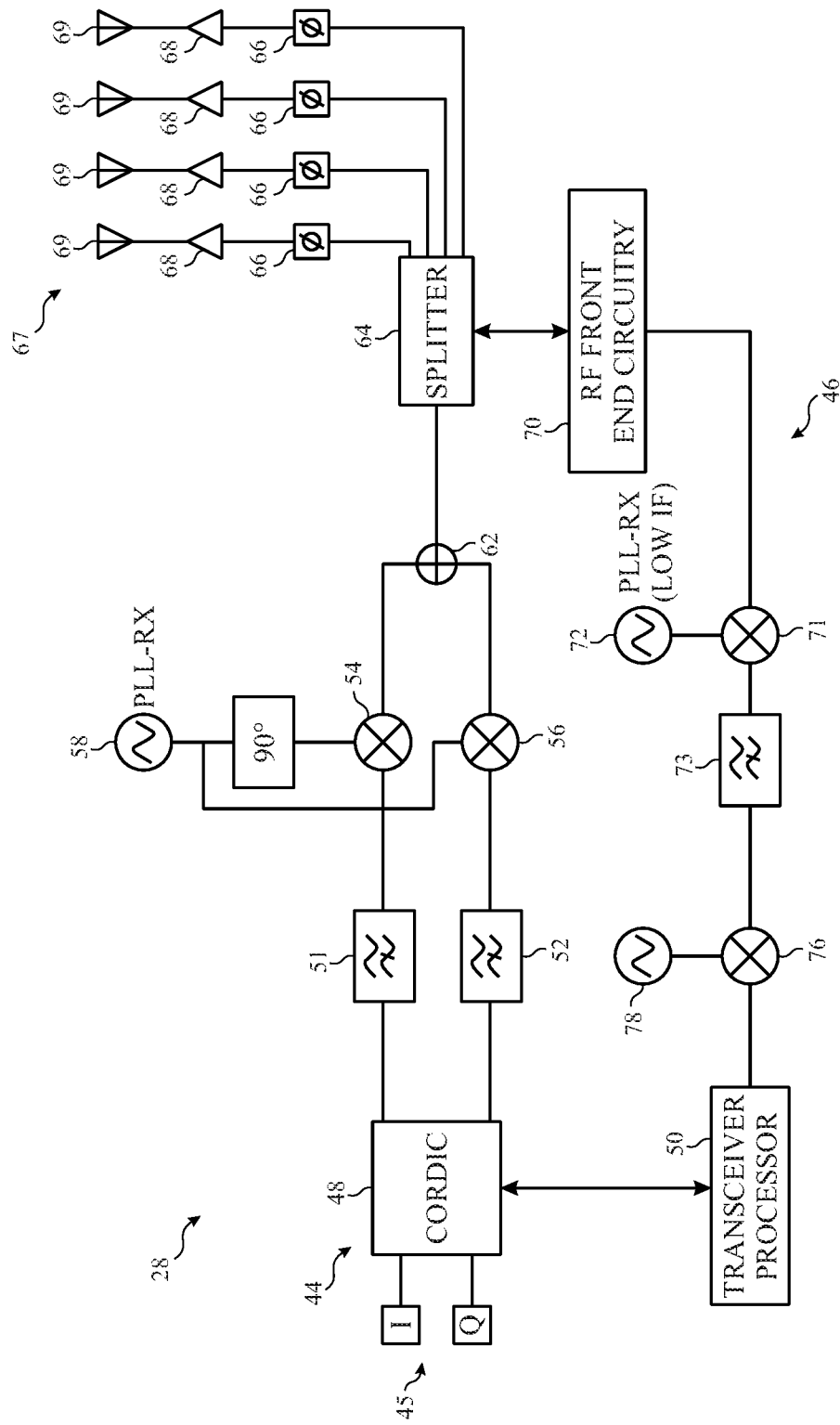
FIG. 7 is a schematic diagram of the transceiver included within the electronic device of FIG. 1, in accordance with an embodiment.

As previously noted above, each embodiment (e.g., notebook computer 10A, handheld device 10B, handheld device 10C, computer 10D, and wearable electronic device 10E) of the electronic device 10 may include a phased antenna array. With the foregoing in mind, FIG. 7 depicts a schematic diagram of the transceiver 28. As illustrated, the transceiver 28 may include a transmitter 44 (e.g., transmitter path) and a receiver 46 (e.g., receiver path) coupled as part of a single unit. As depicted, the transmitter 44 may receive a signal 45 that may be initially modulated via a coordinate rotation digital computer (CORDIC) 48 that may, in some embodiments, be used to process individual Cartesian represented data symbols (e.g., OFDM symbols) into polar amplitude and phase components. In some embodiments, the CORDIC 48 may include a digital signal processor (DSP) or other processor architecture that may be used to process the incoming signal 45. In some embodiments, the CORDIC 48 may also communicate with a transceiver processor 50 (e.g., on-board processor) that may be used to process transmitted and/or received WLAN (e.g., Wi-Fi) and/or cellular (e.g., LTE) signals.

In certain embodiments, during operation, the transmitter 44 may receive a Cartesian coordinate represented signal 45, which may include, for example, data symbols encoded according to orthogonal I/Q vectors. Thus, when an I/Q signal is converted into an electromagnetic wave (e.g., radio frequency (RF) signal, microwave signal, millimeter wave signal), the conversion is generally linear as the I/Q may be frequency band-limited. The I/Q signals 45 may be then respectively passed to high pass filters (HPFs) 51 and 52, which may be provided to pass the higher frequency components of the I/Q signals 45 and filter out the lower frequency components. As further illustrated, the I/Q signals 45 may be then respectively passed to mixers 54 and 56, which may be used to mix (e.g., multiply or upconvert) the in-phase (I) component and the quadrature (Q) component of the I/Q signals 45.

As further illustrated in FIG. 7, a transmitter phase lock loop (PLL-TX) or oscillator 58 may be provided to generate 90° out of phase oscillation signals by which to mix the orthogonal in-phase (I) component and the quadrature (Q) component to generate a carrier frequency and/or radio frequency (RF) signal. The in-phase (I) component and the quadrature (Q) component signals may be then recombined via a mixer 62, and then passed to a splitter 64 to split the signal (e.g., RF signal, microwave signal, millimeter wave signal). Each split signal is then sent to a respective phase shifter 66 and power amplifier 68 to be provided to respective antennas 69 in a phased antenna array 67 (e.g., multiple input multiple output [MIMO] antennas) for transmission. In some embodiments, the antennas 69 may be included on the same integrated chip as the transceiver 28 architecture. However, in other embodiments, the antennas 69 may be fabricated as part of a separate chip and/or circuitry that may be coupled to the other circuitry components of the transceiver 28.

In certain embodiments, as previously noted, the transmitter 44 may be coupled together with the receiver 46. Thus, as illustrated, the transceiver 28 may further include the splitter 64, which may be useful in splitting and routing signals from the transmitter 44 (transmitter path) to the antennas 69 and routing signals received via the antennas 69 to the receiver 46 (e.g., receiver path). In certain embodiments, the transceiver processor 50 in conjunction with an RF front end circuitry 70 (e.g., Wi-Fi and/or LTE RF circuitry) of the transceiver 28 may be used, for example, to support the Wi-Fi and LTE wireless communication standards. Indeed, in certain embodiments, as will be further appreciated, the transceiver processor 50 and the RF front end circuitry 70 may, in addition to allowing the electronic device 10 to support Wi-Fi and LTE wireless applications, be utilized to process and support 5 gigahertz (GHz) (e.g., frequency band of approximately 5.1 GHz to 5.8 GHz) LTE license assisted access (LTE-LAA) wireless communication applications.

For example, in certain embodiments, the RF front end circuitry 70 may allow the transceiver 28 to utilize the dedicated Wi-Fi signal processing circuitry (e.g., 5 GHz signal processing circuitry) to additionally process LTE-LAA wireless signals in order to conserve area, power, and cost of the transceiver 28, and, by extension, the electronic device 10. Indeed, as will be further appreciated, the RF front end circuitry 70 may allow for concurrent reception of both Wi-Fi and LTE-LAA wireless signals (e.g., 5 GHz band cellular signals) by splitting incoming signals (e.g., received signals) during the time, or just after the incoming signals are amplified by a low noise amplifier (LNA) of the RF front end circuitry 70 and/or of the receiver 46. For example, in certain embodiments, the RF front end circuitry 70 may arbitrate between LTE-LAA and Wi-Fi wireless signals to determine when to turn "ON" (e.g., activate) or "OFF" (e.g., deactivate) one or more LNAs of the RF circuitry 70.

As further depicted in FIG. 7, during operation, the receiver 46 may receive RF signals (e.g., LTE and/or Wi-Fi signals) detected by the antennas 69. For example, as illustrated in FIG. 7, received signals may be received by the receiver 46. The received signals may be then passed to a mixer 71 (e.g., downconverter) to mix (e.g., multiply) the received signals with an IF signal (e.g., 10-20 megahertz (MHz) signal) provided by a receiver phase lock loop (PLL-RX) or oscillator 72.

As further illustrated in FIG. 7, the IF signal may be then passed to a low-pass filter 73, and then mixer 76 that may be used to mix (e.g., downconvert a second time) with a lower IF signal generated by an oscillator 78 (e.g., numerically controlled oscillator). The oscillator 78 may include any oscillator device that may be useful in generating an analog or discrete-time and/or frequency domain (e.g., digital domain) representation of a carrier frequency signal. The IF signal may be then passed to the transceiver processor 50 to be processed and analyzed.

Figure 8:
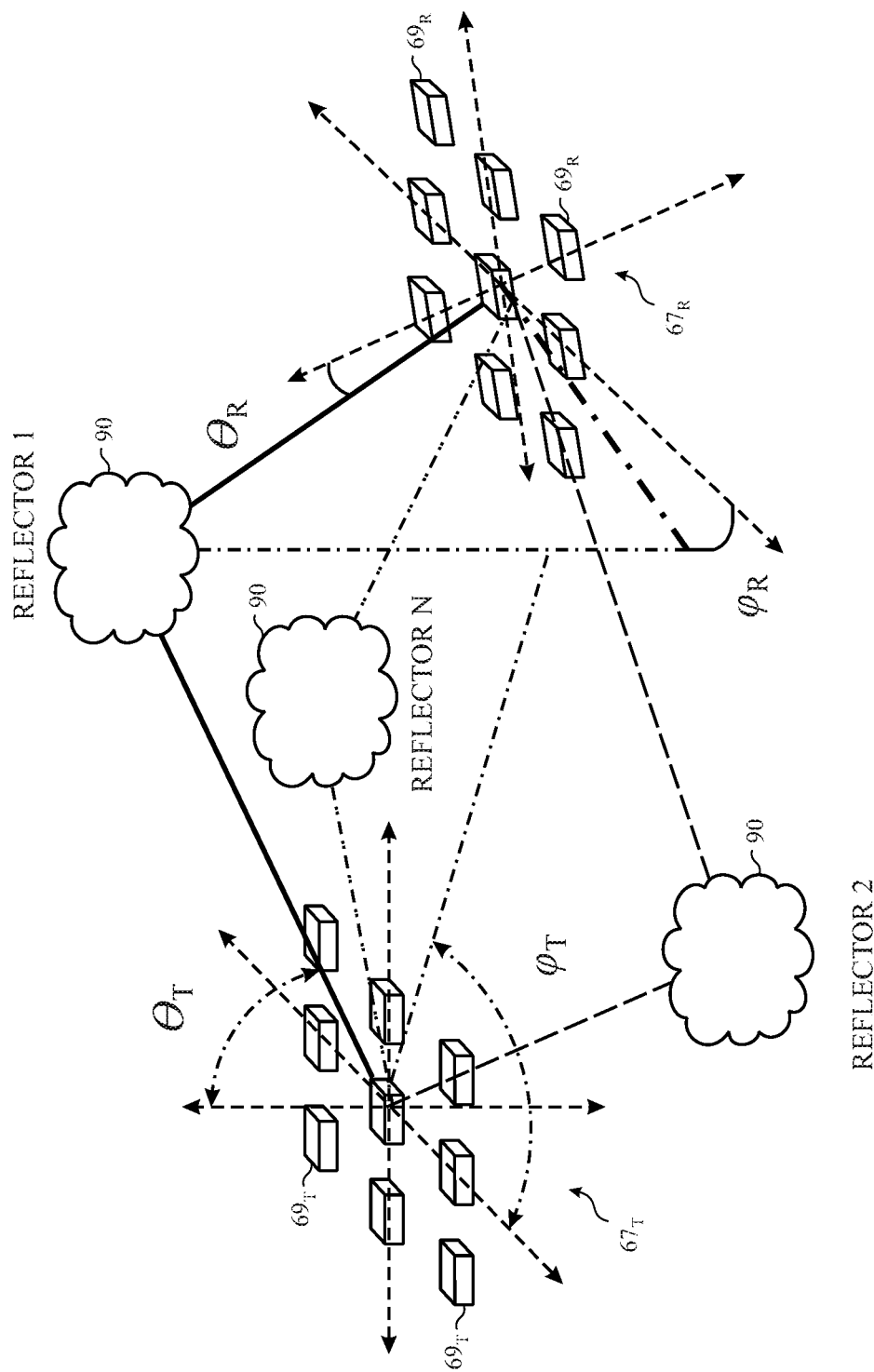
FIG. 8 is a schematic diagram representing incidence angles between transmitting and receiving phased antenna arrays.
Figure 9:
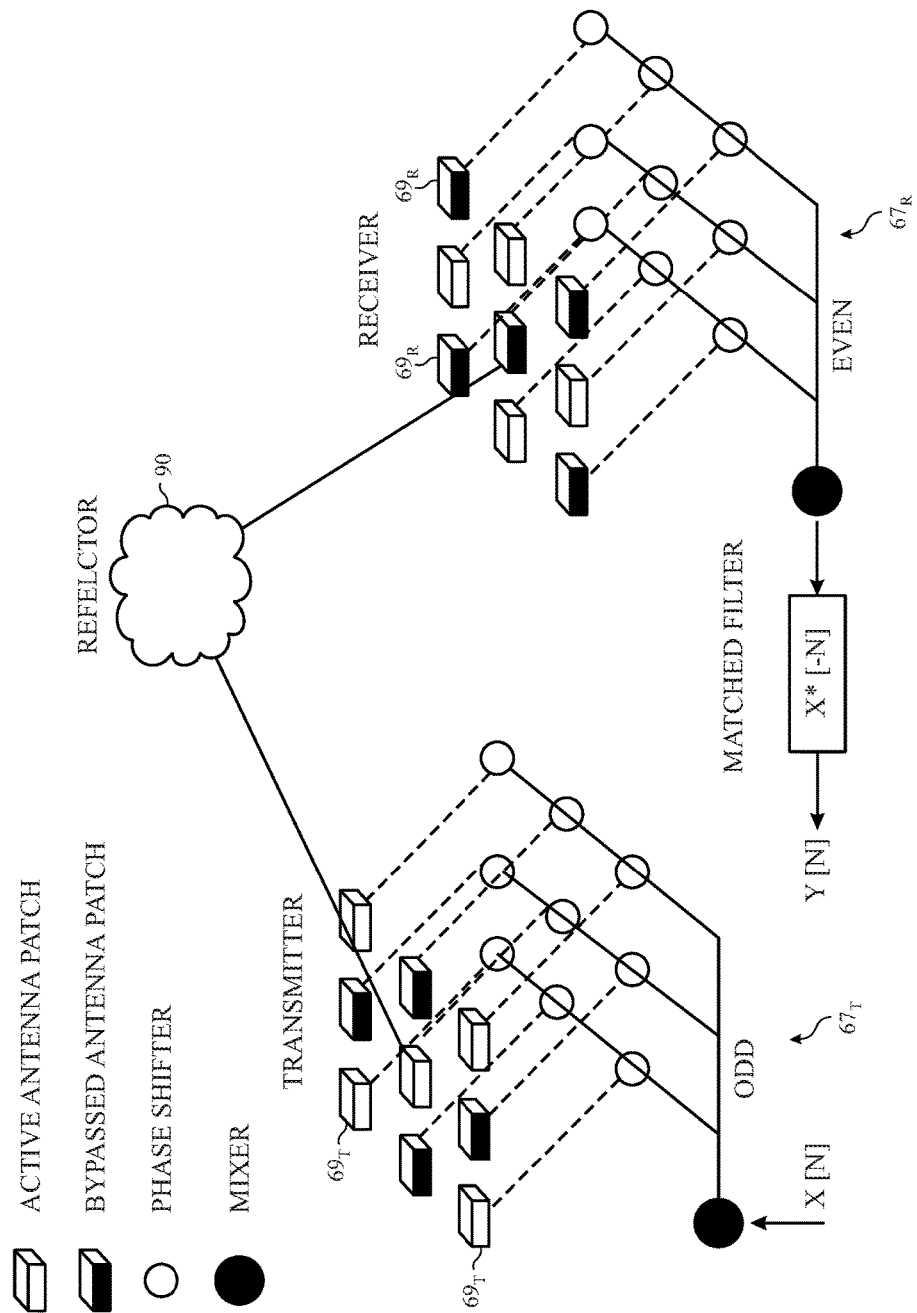
FIG. 9 is a schematic diagram illustrating a first sample measurement using active and bypassed antennas in transmitting and receiving phased antenna arrays.
Figure 10:
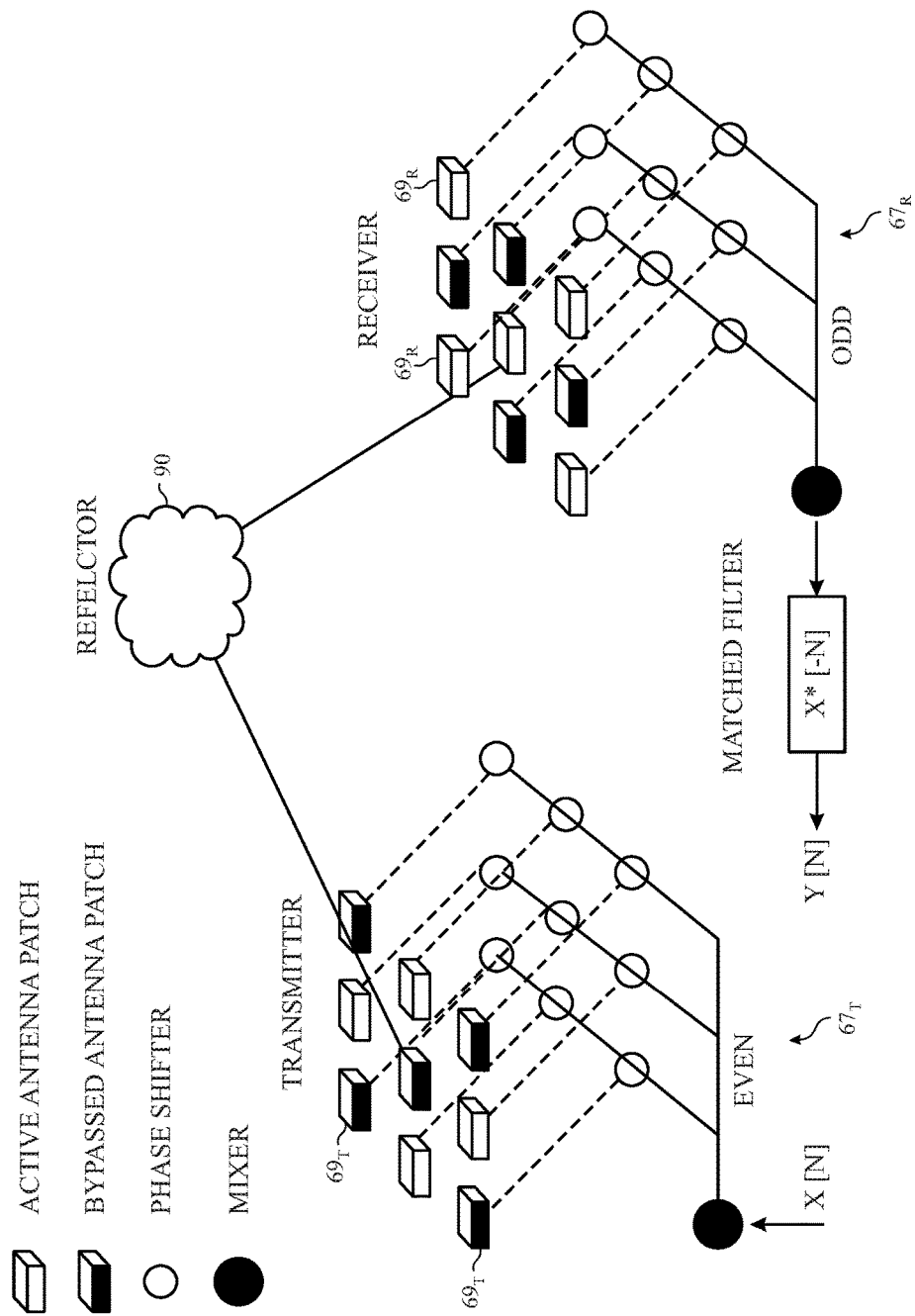
FIG. 10 is a schematic diagram illustrating a second sample measurement using active and bypassed antennas in transmitting and receiving phased antenna arrays.
Figure 11:
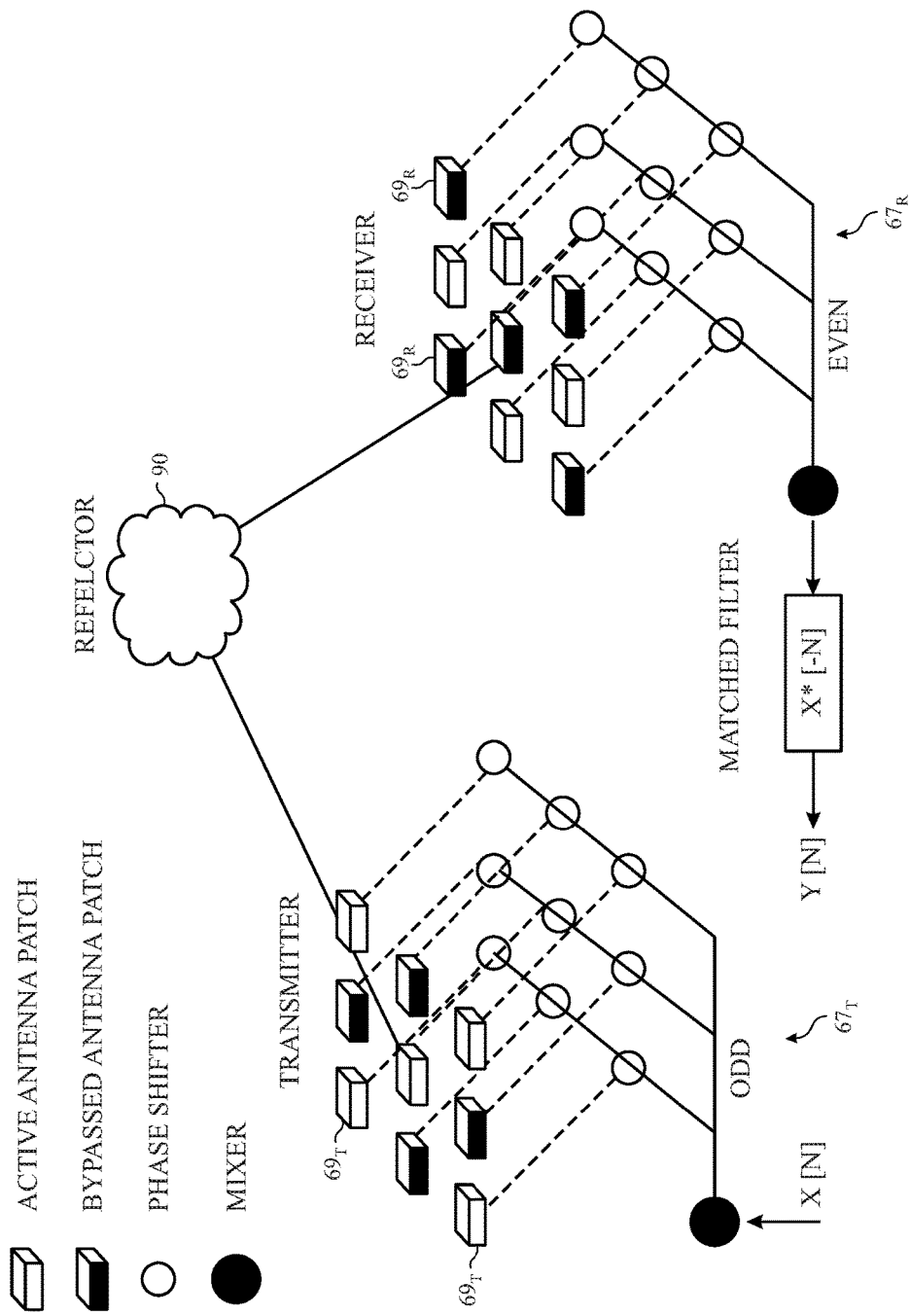
FIG. 11 is a schematic diagram illustrating a third sample measurement using active and bypassed antennas in transmitting and receiving phased antenna arrays.
Figure 12:
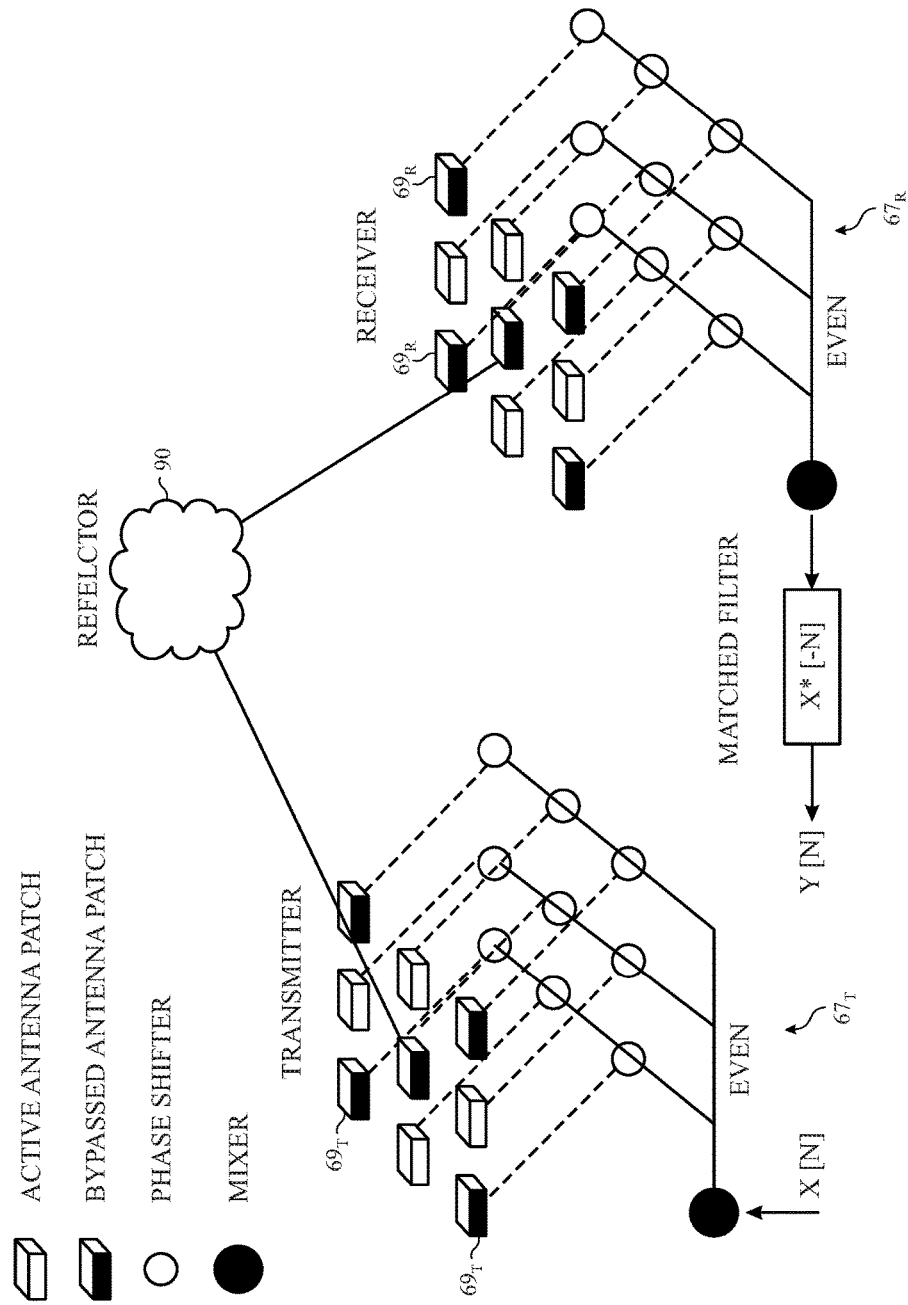
FIG. 12 is a schematic diagram illustrating a fourth sample measurement using active and bypassed antennas in transmitting and receiving phased antenna arrays.
Figure 13:
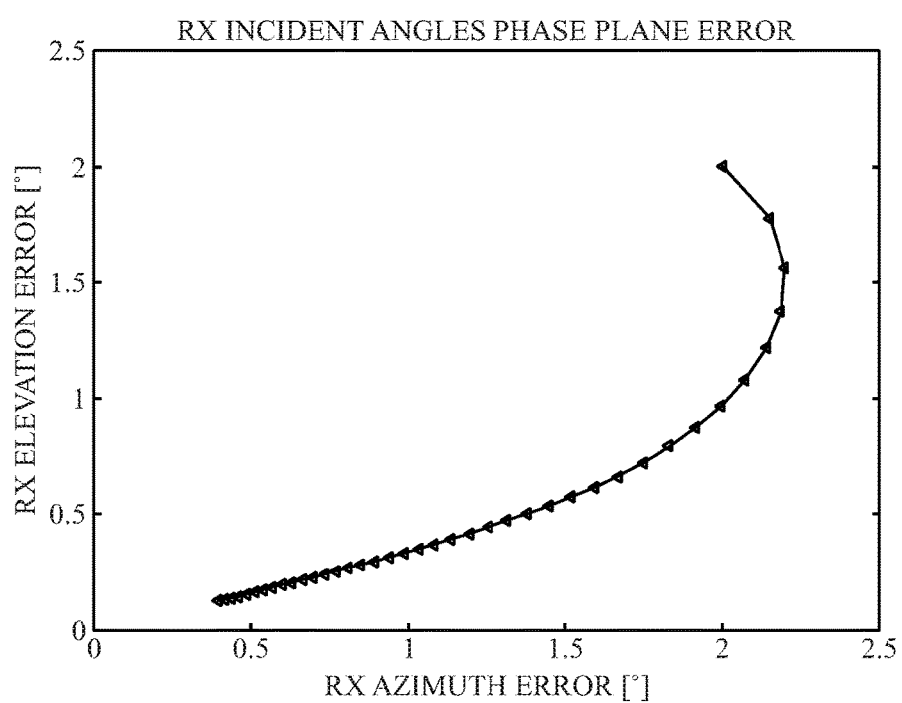
FIG. 13 is a graph illustrating receiving incident angle phase plane error.

Turning now to FIG. 8, a transmitter phased antenna array 67$_T$ is illustrated as being in communication with a receiver phased antenna array 67$_R$. In this embodiment, each antenna array 67$_T$ and 67$_R$ is illustrated as a three-by-three array having nine transmitter antennas 69$_T$ and 69$_R$, respectively. However, it should be understood that the techniques disclosed herein may apply to any size of antenna array, including, but not limited to, two-by-two, three-by-three, four-by-four, five-by-five . . . and by N-by-N. Typically, the antenna arrays 67$_T$ and 67$_R$ are generally planar arrays. Because, as illustrated, the arrays 67$_T$ and 67$_R$ are in communication with one another, the transmitter array 67$_T$ may have a beamforming vector generally directed toward the receiver array 67$_R$ and, similarly, the receiver array 67$_R$ may have a beam tracking vector generally directed toward the transmitter array 67$_T$. Further, the devices 10 associated with each of the arrays 67$_T$ and 67$_R$ may have further information, such as device position, device orientation, device location, as well as information relating to device motion.

Despite all of this information, it may still be difficult to determine the incidence angles in each of the phased antenna arrays 67$_T$ and 67$_R$ because one or more reflectors 90 may be positioned generally between the transmitter array 67$_T$ and the receiver array 67$_R$. Such reflectors may be anything that may affect the RF signals travelling between the transmitter array 67$_T$ and the receiver array 67$_R$, such as people, things, structures, earth, etc. To address this issue, a subset of the transmission antennas 69$_T$ in the transmitter array 67$_T$ and a subset of the receive antennas 69$_R$ in the receiver array 67$_R$ may be activated to perform a measurement, then other subsets may be subsequently activated to perform different measurements. Four of these types of measurements are illustrated in the FIGS. 9-12. As explained in greater detail below, the first measurement activates the odd transmission antennas and the even receive antennas, the second measurement activates the even transmission antennas and the odd receive antennas, the third measurement activates the odd transmission antennas and the odd receive antennas, and the fourth measurement activates the even transmission and the even receive antennas.

Consider a uniform linear array phased array antenna system with L clusters. The composite channel is expressed as $$H = \gamma b a^\dagger \tag{1}$$

wherein vector b and a are the special signature vectors for receiver and transmitter respectively $$\begin{bmatrix} 1 \\ e^{\gamma u_i^x} \\ \vdots \\ e^{j(N-1)u_i^x} \end{bmatrix} \otimes \begin{bmatrix} 1 \\ e^{j u_i^y} \\ \vdots \\ e^{j(N-1)u_i^y} \end{bmatrix} \tag{2}$$

wherein $$u_i^x = \cos(\phi_i)\sin(\theta_i) \tag{3}$$

$$u_i^y = \sin(\phi_i)\sin(\theta_i) \tag{4}$$

With i∈{T, R}, $\theta_T$ and $\phi_T$ are the transmitter elevation and azimuth angles in a and $\theta_R$ and $\phi_R$ are the receiver elevation and azimuth angles in b.

Once the transmitter beamforming vector v and receiver beamforming vector w are applied, a single input signal output SISO channel is observed $$y = \gamma w^\dagger b a^\dagger v + z[n] \tag{5}$$

By inspecting equation (5), one can conclude that there are 6 unknown variables ($\phi_T$, $\theta_T$, $\phi_R$, $\theta_R$, R(γ) and T(γ)).

With only one complex observation, the system is quite undetermined. To overcome this problem, the TX and RX antennas may be split into two non-overlapping sets, denoted by even and odd subscripts, and make four measurements associated with these antenna subsets.

$$y_1 = \gamma w_e^\dagger b_e a_o^\dagger v_o + z_{eo} \tag{6}$$

$$y_2 = \gamma w_o^\dagger b_o a_e^\dagger v_{oe} + z_{oe} \tag{7}$$

$$y_3 = \gamma w_o^\dagger b_o a_o^\dagger v_o + z_{oo} \tag{8}$$

$$y_4 = \gamma w_e^\dagger b_e a_e^\dagger v_e + z_{ee} \tag{9}$$

The objective is to find a set of azimuth and elevation angles for the TX and RX and also the complex weight coefficient that satisfy $$f = \|y_1 - \gamma w_e^\dagger b_e a_o^\dagger v_o\|^2 + \|y_2 - \gamma w_o^\dagger b_o a_e^\dagger v_e\|^2 + \|y_3 - \gamma w_o^\dagger b_o a_o^\dagger v_o\|^2 + \|y_4 - \gamma w_e^\dagger b_e a_e^\dagger v_e\|^2 \tag{10}$$

Using the chain rule, one can conclude $$\nabla_{\theta_R} f = 2\Re\left\{\sum_p \frac{\partial f}{\partial (b_e^\dagger[p])} \frac{\partial (b_e^\dagger[p])}{\partial \theta_R} + \frac{\partial f}{\partial (b_o^\dagger[p])} \frac{\partial (b_o^\dagger[p])}{\partial \theta_R}\right. \tag{11}$$

$$\nabla_{\phi_R} f = 2\Re\left\{\sum_p \frac{\partial f}{\partial (b_e^\dagger[p])} \frac{\partial (b_e^\dagger[p])}{\partial \phi_R} + \frac{\partial f}{\partial (b_o^\dagger[p])} \frac{\partial (b_o^\dagger[p])}{\partial \phi_R}\right. \tag{12}$$

$$\nabla_{\theta_T} f = 2\Re\left\{\sum_p \frac{\partial f}{\partial (a_e^\dagger[p])} \frac{\partial (a_e^\dagger[p])}{\partial \theta_T} + \frac{\partial f}{\partial (a_o^\dagger[p])} \frac{\partial (a_o^\dagger[p])}{\partial \theta_T}\right. \tag{13}$$

$$\nabla_{\phi_T} f = 2\Re\left\{\sum_p \frac{\partial f}{\partial (a_e^\dagger[p])} \frac{\partial (a_e^\dagger[p])}{\partial \phi_T} + \frac{\partial f}{\partial (a_o^\dagger[p])} \frac{\partial (a_o^\dagger[p])}{\partial \phi_T}\right. \tag{14}$$

-continued $$\nabla_{\gamma^\dagger} f = -y_1 v_o^\dagger a_o b_e^\dagger w_e + \gamma \|w_e^\dagger b_e a_o^\dagger v_o\|^2 - y_2 v_e^\dagger a_e b_o^\dagger w_o + \gamma \|w_o^\dagger b_o a_e^\dagger v_e\|^2 - y_3 v_o^\dagger a_o b_o^\dagger w_o + \gamma \|w_o^\dagger b_o a_o^\dagger v_o\|^2 - y_4 v_e^\dagger a_e b_e^\dagger w_e + \gamma \|w_e^\dagger b_e a_e^\dagger v_e\|^2 \quad (15)$$

$$\nabla_\gamma f = -y_1^\dagger w_e^\dagger b_e a_o^\dagger v_o + \gamma^\dagger \|w_e^\dagger b_e a_o^\dagger v_o\|^2 - y_2^\dagger w_o^\dagger b_o a_e^\dagger v_e + \gamma^\dagger \|w_o^\dagger b_o a_e^\dagger v_e\|^2 - y_3^\dagger w_o^\dagger b_o a_o^\dagger v_o + \gamma^\dagger \|w_o^\dagger b_o a_o^\dagger v_o\|^2 - y_4^\dagger w_e^\dagger b_e a_e^\dagger v_e + \gamma^\dagger \|w_e^\dagger b_e a_e^\dagger v_e\|^2$$

$$\frac{\partial f}{\partial (b_e^\dagger[p])} = t_1[p] - y_1 c_1^\dagger[p] + t_4[p] - y_4 c_4^\dagger[p] \quad (16)$$

wherein $$c_1 \triangleq \gamma a_o^\dagger v_o w_e^\dagger \quad (17)$$

$$t_1 \triangleq c_1^\dagger c_1 b_e \quad (18)$$

$$c_4 \triangleq \gamma a_e^\dagger v_e w_e^\dagger \quad (19)$$

$$t_4 \triangleq c_4^\dagger c_4 b_e. \quad (20)$$

Similarly $$\frac{\partial f}{\partial (b_o^\dagger[p])} = t_2[p] - y_2 c_2^\dagger[p] + t_3[p] - y_3 c_3^\dagger[p] \quad (21)$$

wherein $$c_2 \triangleq \gamma a_e^\dagger v_e w_o^\dagger \quad (22)$$

$$t_2 \triangleq c_2^\dagger c_2 b_o \quad (23)$$

$$c_3 \triangleq \gamma a_o^\dagger v_o w_o^\dagger \quad (24)$$

$$t_3 \triangleq c_3^\dagger c_3 b_o. \quad (25)$$

$$\frac{\partial f}{\partial (a_o^\dagger[p])} = u_1[p] - y_1^\dagger d_1^\dagger[p] + u_3[p] - y_3^\dagger d_3^\dagger[p] \quad (26)$$

wherein $$d_1 \triangleq \gamma^\dagger b_e^\dagger w_e v_o^\dagger \quad (27)$$

$$u_1 \triangleq d_1^\dagger d_1 a_o \quad (28)$$

$$d_3 \triangleq \gamma^\dagger b_o^\dagger w_o v_o^\dagger \quad (29)$$

$$u_3 \triangleq d_3^\dagger d_3 a_o. \quad (30)$$

Similarly $$\frac{\partial f}{\partial (a_e^\dagger[p])} = u_2[p] - y_2^\dagger d_2^\dagger[p] + u_4[p] - y_4^\dagger d_4^\dagger[p] \quad (31)$$

wherein $$d_2 \triangleq \gamma^\dagger b_o^\dagger w_o v_e^\dagger \quad (32)$$

$$u_2 \triangleq d_2^\dagger d_2 a_e \quad (33)$$

$$d_4 \triangleq \gamma^\dagger b_e^\dagger w_e v_e^\dagger \quad (34)$$

$$u_4 \triangleq d_4^\dagger d_4 a_e. \quad (35)$$

In what follows, partial derivatives $$\frac{\partial (b^\dagger[k])}{\partial \theta_R} \text{ and } \frac{\partial (b^\dagger[k])}{\partial \phi_R}$$

are computed. The generalization of these derivatives to the transmitter is straightforward.

$$b[k] = e^{jK_0[mu_R^x + nu_R^y]}, n = \mathrm{mod}(k, N), m = \frac{k-n}{N} \quad (36)$$

$$\frac{\partial (b^\dagger[k])}{\partial \theta_R} = e^{-jK_0[mu_R^x + nu_R^y]}(-j)\left(m\frac{\partial u_R^x}{\partial \theta_R} + n\frac{\partial u_R^y}{\partial \theta_R}\right) = b^\dagger[k] \odot g_{\theta_R}[k] \quad (37)$$

$$g_{\theta_R} = (_{-j}K_0) < \left\{ \begin{bmatrix} 1 \\ e^{j\frac{\partial u_R^x}{\partial \theta_R}} \\ \vdots \\ e^{j(N-1)\frac{\partial u_R^x}{\partial \theta_R}} \end{bmatrix} \otimes \begin{bmatrix} 1 \\ e^{j\frac{\partial u_R^y}{\partial \theta_R}} \\ \vdots \\ e^{j(N-1)\frac{\partial u_R^y}{\partial \theta_R}} \end{bmatrix} \right\} \quad (38)$$

wherein $$\frac{\partial u_R^x}{\partial \theta_R} = \cos(\phi_R)\cos(\theta_R) \quad (39)$$

$$\frac{\partial u_R^y}{\partial \theta_R} = \sin(\phi_R)\cos(\theta_R) \quad (40)$$

Similarly, $$\frac{\partial (b^\dagger[k])}{\partial \phi_R} = e^{-jK_0[mu_R^x + nu_R^y]}(-j K_0)\left(m\frac{\partial u_R^x}{\partial \phi_R} + n\frac{\partial u_R^y}{\partial \phi_R}\right) = b^\dagger[k] \odot g_{\phi_R}[k] \quad (41)$$

$$g_{\phi_R} = (_{-j}K_0) < \left\{ \begin{bmatrix} 1 \\ e^{j\frac{\partial u_R^x}{\partial \phi_R}} \\ \vdots \\ e^{j(N-1)\frac{\partial u_R^x}{\partial \phi_R}} \end{bmatrix} \otimes \begin{bmatrix} 1 \\ e^{j\frac{\partial u_R^y}{\partial \phi_R}} \\ \vdots \\ e^{j(N-1)\frac{\partial u_R^y}{\partial \phi_R}} \end{bmatrix} \right\} \quad (42)$$

wherein $$\frac{\partial u_R^x}{\partial \phi_R} = -\sin(\phi_R)\sin(\theta_R) \quad (43)$$

$$\frac{\partial u_R^y}{\partial \phi_R} = \cos(\phi_R)\sin(\theta_R) \quad (44)$$

$$\nabla^2_{\theta_R} = \frac{\partial}{\partial \theta_R} \left\{ \sum_p \frac{\partial f}{\partial (b_e^\dagger[p])} \frac{\partial (b_e^\dagger[p])}{\partial \theta_R} + \frac{\partial f}{\partial (b_e[p])} \frac{\partial (b_e[p])}{\partial \theta_R} + \sum_s \frac{\partial f}{\partial (b_o^\dagger[s])} \frac{\partial (b_o^\dagger[s])}{\partial \theta_R} + \frac{\partial f}{\partial (b_o[s])} \frac{\partial (b_o[s])}{\partial \theta_R} \right\} = \quad (45)$$

$$2\Re\left\{\sum_q \frac{\partial\left[\sum_p \frac{\partial f}{\partial(b_e^\dagger[p])}\frac{\partial(b_e^\dagger[p])}{\partial\theta_R}\right]}{\partial b_e^\dagger[q]}\frac{\partial(b_e^\dagger[q])}{\partial\theta_R}+\right.$$

$$\sum_t \frac{\partial\left[\sum_p \frac{\partial f}{\partial(b_e^\dagger[p])}\frac{\partial(b_e^\dagger[p])}{\partial\theta_R}\right]}{\partial b_e^\dagger[t]}\frac{\partial(b_o^\dagger[t])}{\partial\theta_R}\right\}+$$

$$2\Re\left\{\sum_q \frac{\partial\left[\sum_p \frac{\partial f}{\partial(b_e[p])}\frac{\partial(b_e[p])}{\partial\theta_R}\right]}{\partial b_e^\dagger[q]}\frac{\partial(b_e^\dagger[q])}{\partial\theta_R}+\right.$$

$$\sum_t \frac{\partial\left[\sum_p \frac{\partial f}{\partial(b_e[p])}\frac{\partial(b_e[p])}{\partial\theta_R}\right]}{\partial b_e^\dagger[t]}\frac{\partial(b_o^\dagger[t])}{\partial\theta_R}\right\}+$$

$$2\Re\left\{\sum_q \frac{\partial\left[\sum_s \frac{\partial f}{\partial(b_o^\dagger[s])}\frac{\partial(b_o^\dagger[s])}{\partial\theta_R}\right]}{\partial b_e^\dagger[q]}\frac{\partial(b_e^\dagger[q])}{\partial\theta_R}+\right.$$

$$\sum_t \frac{\partial\left[\sum_s \frac{\partial f}{\partial(b_o^\dagger[s])}\frac{\partial(b_o^\dagger[s])}{\partial\theta_R}\right]}{\partial b_e^\dagger[t]}\frac{\partial(b_o^\dagger[t])}{\partial\theta_R}\right\}+$$

$$2\Re\left\{\sum_q \frac{\partial\left[\sum_s \frac{\partial f}{\partial(b_o[s])}\frac{\partial(b_o[s])}{\partial\theta_R}\right]}{\partial b_e^\dagger[q]}\frac{\partial(b_e^\dagger[q])}{\partial\theta_R}+\right.$$

$$\left.\sum_t \frac{\partial\left[\frac{\partial f}{\partial(b_o[s])}\frac{\partial(b_o[s])}{\partial\theta_R}\right]}{\partial b_e^\dagger[t]}\frac{\partial(b_o^\dagger[t])}{\partial\theta_R}\right\}.$$

Using identities, it is straightforward to show $$\frac{\partial\left[\frac{\partial f}{\partial b_e^\dagger[p]}\right]}{\partial b_e^\dagger[q]}=0 \tag{46}$$

$$\frac{\partial\left[\frac{\partial f}{\partial b_e^\dagger[p]}\right]}{\partial b_o^\dagger[t]}=0 \tag{47}$$

$$\frac{\partial\left[\frac{\partial f}{\partial b_e[p]}\right]}{\partial b_e^\dagger[q]}=\left[c_1^\dagger c_1+c_4^\dagger c_4\right][q,p] \tag{48}$$

$$\frac{\partial\left[\frac{\partial f}{\partial b_e[p]}\right]}{\partial b_o^\dagger[t]}=0 \tag{49}$$

$$\frac{\partial\left[\frac{\partial f}{\partial b_o^\dagger[s]}\right]}{\partial b_e^\dagger[q]}=0 \tag{50}$$

$$\frac{\partial\left[\frac{\partial f}{\partial b_o^\dagger[s]}\right]}{\partial b_o^\dagger[t]}=0 \tag{51}$$

$$\frac{\partial\left[\frac{\partial f}{\partial b_o[s]}\right]}{\partial b_e^\dagger[q]}=0 \tag{52}$$

$$\frac{\partial\left[\frac{\partial f}{\partial b_o[s]}\right]}{\partial b_o^\dagger[t]}=\left[c_2^\dagger c_2+c_3^\dagger c_3\right][t,s]. \tag{53}$$

Substituting equations into equation (45), one can arrive at the following identities for the diagonal entries of the Hessian matrix.

$$\nabla_{\theta_R}^2 = 2\Re\{(\nabla_{\theta_R}b_e^*)^\dagger \mathcal{B}_e^T(\nabla_{\theta_R}b_e^*)+(\nabla_{\theta_R}b_o^*)^\dagger \mathcal{B}_o^T(\nabla_{\theta_R}b_o^*)\}$$

$$\nabla_{\phi_R}^2 = 2\Re\{(\nabla_{\phi_R}b_e^*)^\dagger \mathcal{B}_e^T(\nabla_{\phi_R}b_e^*)+(\nabla_{\phi_R}b_o^*)^\dagger \mathcal{B}_o^T(\nabla_{\phi_R}b_o^*)\}$$

$$\nabla_{\theta_T}^2 = 2\Re\{(\nabla_{\theta_T}a_e^*)^\dagger \mathcal{B}_e^T(\nabla_{\theta_T}a_e^*)+(\nabla_{\theta_T}a_o^*)^\dagger \mathcal{B}_o^T(\nabla_{\theta_T}a_o^*)\}$$

$$\nabla_{\phi_T}^2 = 2\Re\{(\nabla_{\phi_T}a_e^*)^\dagger \mathcal{B}_e^T(\nabla_{\phi_T}a_e^*)+(\nabla_{\phi_T}a_o^*)^\dagger \mathcal{B}_o^T(\nabla_{\phi_T}b_o^*)\} \tag{54}$$

wherein $$\mathcal{B}_e \triangleq c_1^\dagger c_1 + c_4^\dagger c_4 \tag{55}$$

$$\mathcal{B}_o \triangleq c_2^\dagger c_2 + c_3^\dagger c_3 \tag{56}$$

$$\mathcal{A}_e \triangleq d_1^\dagger d_1 + d_4^\dagger d_4 \tag{57}$$

$$\mathcal{A}_e \triangleq d_1^\dagger d_1 + d_4^\dagger d_4. \tag{58}$$

Similarly, (60)

$$\nabla_{\theta_R\phi_R}^2 = 2\Re\{(\nabla_{\theta_R}b_e^*)^\dagger \mathcal{B}_e^T(\nabla_{\phi_R}b_e^*)+(\nabla_{\theta_R}b_o^*)^\dagger \mathcal{B}_o^T(\nabla_{\phi_R}b_o^*)\}$$

$$\nabla_{\theta_T\phi_T}^2 = 2\Re\{(\nabla_{\theta_T}a_e^*)^\dagger \mathcal{A}_e^T(\nabla_{\phi_T}a_e^*)+(\nabla_{\theta_T}a_o^*)^\dagger \mathcal{A}_o^T(\nabla_{\phi_R}a_o^*)\}$$

(61)

$$\nabla_{\theta_R\theta_T}^2 = \frac{\partial}{\partial\theta_R}\left\{\sum_p \frac{\partial f}{\partial(a_e^\dagger[p])}\frac{\partial(a_e^\dagger[p])}{\partial\theta_T}+\frac{\partial f}{\partial(a_e[p])}\frac{\partial(a_e[p])}{\partial\theta_T}+\right.$$

$$\left.\sum_s \frac{\partial f}{\partial(a_o^\dagger[s])}\frac{\partial(a_o^\dagger[s])}{\partial\theta_T}+\frac{\partial f}{\partial(a_o[s])}\frac{\partial(a_o[s])}{\partial\theta_T}\right\}=$$

$$2\Re\left\{\sum_q \frac{\partial\left[\sum_p \frac{\partial f}{\partial(a_e^\dagger[p])}\frac{\partial(a_e^\dagger[p])}{\partial\theta_T}\right]}{\partial b_e^\dagger[q]}\frac{\partial(b_e^\dagger[q])}{\partial\theta_R}+\right.$$

$$\sum_t \frac{\partial\left[\sum_p \frac{\partial f}{\partial(a_e^\dagger[p])}\frac{\partial(d_e^\dagger[p])}{\partial\theta_R}\right]}{\partial b_e^\dagger[t]}\frac{\partial(b_o^\dagger[t])}{\partial\theta_R}+$$

$$2\Re\left\{\sum_q \frac{\partial\left[\sum_p \frac{\partial f}{\partial(a_e[p])}\frac{\partial(a_e[p])}{\partial \theta_T}\right]}{\partial b_e^\dagger[q]}\frac{\partial(b_e^\dagger[q])}{\partial \theta_R} + \right.$$

$$\sum_t \frac{\partial\left[\sum_p \frac{\partial f}{\partial(a_e[p])}\frac{\partial(a_e[p])}{\partial \theta_T}\right]}{\partial b_e^\dagger[t]}\frac{\partial(b_o^\dagger[t])}{\partial \theta_R}\right\} +$$

$$2\Re\left\{\sum_q \frac{\partial\left[\sum_s \frac{\partial f}{\partial(a_o^\dagger[s])}\frac{\partial(a_o^\dagger[s])}{\partial \theta_T}\right]}{\partial b_e^\dagger[q]}\frac{\partial(b_e^\dagger[q])}{\partial \theta_R} + \right.$$

$$\sum_t \frac{\partial\left[\sum_s \frac{\partial f}{\partial a_o^\dagger[s]}\frac{\partial(a_o^\dagger[s])}{\partial \theta_T}\right]}{\partial b_e^\dagger[t]}\frac{\partial(b_o^\dagger[t])}{\partial \theta_R}\right\} +$$

$$2\Re\left\{\sum_q \frac{\partial\left[\sum_s \frac{\partial f}{\partial(b_o[s])}\frac{\partial(b_o[s])}{\partial \theta_R}\right]}{\partial b_e^\dagger[q]}\frac{\partial(b_e^\dagger[q])}{\partial \theta_R} + \right.$$

$$\left.\sum_t \frac{\partial\left[\sum_s \frac{\partial f}{\partial(b_o[s])}\frac{\partial(b_o[s])}{\partial \theta_R}\right]}{\partial b_e^\dagger[t]}\frac{\partial(b_o^\dagger[t])}{\partial \theta_R}\right\}. \tag{62}$$

$$\frac{\partial\left[\frac{\partial f}{\partial b_e^\dagger[p]}\right]}{\partial a_e^\dagger[q]} = 0 \tag{63}$$

$$\frac{\partial\left[\frac{\partial f}{\partial b_e^\dagger[p]}\right]}{\partial a_o^\dagger[t]} = 0 \tag{64}$$

$$\frac{\partial\left[\frac{\partial f}{\partial b_e[p]}\right]}{\partial a_e^\dagger[q]} = [c_1^\dagger c_1 + c_4^\dagger c_4][q,p] \tag{65}$$

$$\frac{\partial\left[\frac{\partial f}{\partial b_e[p]}\right]}{\partial a_o^\dagger[t]} = 0 \tag{66}$$

$$\frac{\partial\left[\frac{\partial f}{\partial b_o^\dagger[s]}\right]}{\partial a_e^\dagger[q]} = 0 \tag{67}$$

$$\frac{\partial\left[\frac{\partial f}{\partial b_o^\dagger[s]}\right]}{\partial a_o^\dagger[t]} = 0 \tag{68}$$

$$\frac{\partial\left[\frac{\partial f}{\partial b_o[s]}\right]}{\partial a_e^\dagger[q]} = 0 \tag{69}$$

$$\frac{\partial\left[\frac{\partial f}{\partial b_o[s]}\right]}{\partial a_o^\dagger[t]} = [c_2^\dagger c_2 + c_3^\dagger c_3][t,s]. \tag{70}$$

$$\nabla^2_{\theta_R \theta_T} =$$
$$2\Re\left\{(\nabla_{\theta_T} a_e^*)^\dagger(-y_4^\dagger \gamma \mathcal{U}_{ee}^T)(\nabla_{\theta_R} b_e^*) + (\nabla_{\theta_T} a_e^*)^\dagger(-y_2^\dagger \gamma \mathcal{U}_{oe}^T)(\nabla_{\theta_R} b_o^*)\right\}$$
$$2\Re\left\{(\nabla_{\theta_T} a_o^*)^\dagger(-y_3^\dagger \gamma \mathcal{U}_{oo}^T)(\nabla_{\theta_R} b_o^*) + (\nabla_{\theta_T} a_o^*)^\dagger(-y_1^\dagger \gamma \mathcal{U}_{eo}^T)(\nabla_{\theta_R} b_e^*)\right\} \tag{71}$$

$$\nabla^2_{\theta_R \phi_T} =$$
$$2\Re\left\{(\nabla_{\phi_T} a_e^*)^\dagger(-y_4^\dagger \gamma \mathcal{U}_{ee}^T)(\nabla_{\theta_R} b_e^*) + (\nabla_{\phi_T} a_e^*)^\dagger(-y_2^\dagger \gamma \mathcal{U}_{oe}^T)(\nabla_{\theta_R} b_o^*)\right\}$$
$$2\Re\left\{(\nabla_{\phi_T} a_o^*)^\dagger(-y_3^\dagger \gamma \mathcal{U}_{oo}^T)(\nabla_{\theta_R} b_o^*) + (\nabla_{\phi_T} a_o^*)^\dagger(-y_1^\dagger \gamma \mathcal{U}_{eo}^T)(\nabla_{\theta_R} b_e^*)\right\} \tag{72}$$

$$\nabla^2_{\phi_R \theta_T} =$$
$$2\Re\left\{(\nabla_{\theta_T} a_e^*)^\dagger(-y_4^\dagger \gamma \mathcal{U}_{ee}^T)(\nabla_{\phi_R} b_e^*) + (\nabla_{\theta_T} a_e^*)^\dagger(-y_2^\dagger \gamma \mathcal{U}_{oe}^T)(\nabla_{\phi_R} b_o^*)\right\}$$
$$2\Re\left\{(\nabla_{\theta_T} a_o^*)^\dagger(-y_3^\dagger \gamma \mathcal{U}_{oo}^T)(\nabla_{\phi_R} b_o^*) + (\nabla_{\theta_T} a_o^*)^\dagger(-y_1^\dagger \gamma \mathcal{U}_{eo}^T)(\nabla_{\phi_R} b_e^*)\right\} \tag{73}$$

$$\nabla^2_{\theta_R \phi_T} =$$
$$2\Re\left\{(\nabla_{\phi_T} a_e^*)^\dagger(-y_4^\dagger \gamma \mathcal{U}_{ee}^T)(\nabla_{\theta_R} b_e^*) + (\nabla_{\phi_T} a_e^*)^\dagger(-y_2^\dagger \gamma \mathcal{U}_{oe}^T)(\nabla_{\theta_R} b_o^*)\right\}$$
$$2\Re\left\{(\nabla_{\phi_T} a_o^*)^\dagger(-y_3^\dagger \gamma \mathcal{U}_{oo}^T)(\nabla_{\phi_R} b_o^*) + (\nabla_{\phi_T} a_o^*)^\dagger(-y_1^\dagger \gamma \mathcal{U}_{eo}^T)(\nabla_{\phi_R} b_e^*)\right\}$$

wherein $$\mathcal{U}_{ee} = w_e v_e^\dagger \tag{74}$$

$$\mathcal{U}_{eo} = w_e v_o^\dagger \tag{75}$$

$$\mathcal{U}_{oe} = w_o v_e^\dagger \tag{76}$$

$$\mathcal{U}_{oo} = w_o v_o^\dagger. \tag{78}$$

Complex Update $$\gamma^{(n+1)} = \gamma^n - (\nabla_{\gamma\gamma}^2 f)^{-1} \nabla_\gamma f \tag{79}$$

Real Vector $$x^{(n)} = \begin{bmatrix} \theta_R^{(n)} \\ \phi_R^{(n)} \\ \theta_T^{(n)} \\ \phi_T^{(n)} \end{bmatrix} \tag{80}$$

$$x^{(n+1)} = x^{(n)} - (D)^{-1} g \tag{81}$$

$$D = \begin{pmatrix} \nabla^2_{\theta_R} & \nabla^2_{\theta_R \phi_R} & \nabla^2_{\theta_R \theta_T} & \nabla^2_{\theta_R \phi_T} \\ \nabla^2_{\theta_R \phi_R} & \nabla^2_{\phi_R} f & \nabla^2_{\phi_R \theta_T} & \nabla^2_{\phi_R \phi_T} \\ \nabla^2_{\theta_R \theta_T} & \nabla^2_{\phi_R \theta_T} & \nabla^2_{\theta_T} f & \nabla^2_{\theta_T \phi_T} \\ \nabla^2_{\theta_R \phi_T} & \nabla^2_{\phi_R \phi_T} & \nabla^2_{\theta_T \phi_T} & \nabla^2_{\phi_T} f \end{pmatrix} \tag{82}$$

and

-continued $$g = \begin{pmatrix} \nabla_{\theta_R} f \\ \nabla_{\phi_R} f \\ \nabla_{\theta_T} f \\ \nabla_{\phi_T} f \end{pmatrix}.$$ (83)

In many scenarios, the four measurements obtained from selecting even/odd polyphase subsets in the transmitter/receiver phased antenna arrays $67_T$ and $67_R$ would not suffice the convergence of the proposed scheme. More specifically, when linearized around the solution, the four equations are somehow dependent.

To overcome this problem, more measurements may be collected. One way to achieve to this goal is to sample the observation in various spatial domains. For instance, the TX and RX antenna patterns may be rotated by $\pi/2(90°)$ and $-\pi/2(-90°)$. When rotating the transmitter and receiver antenna patterns by multiples of $\pi/2$, one should note that the gradient and Hessians forms obtained earlier are not directly applicable. This is mainly due to the fact that the antenna patterns do not have the same spatial pattern with respect to the zero azimuth angles. Therefore, one may compute the differential form for the rotated sets. To overcome this issue, we also assume that zero azimuth access for the rotated vectors are also being rotated along with the antenna patterns. Thus, antenna patterns always have the same spatial distance with respect to the zero azimuth axis and the same differential forms can be used for rotated antenna patterns Thus for the rotated antenna patterns, we use the following TX and RX azimuth angles.

$$\phi_T[p] \rightarrow \phi_T + n\frac{\pi}{2}, n = \{-1.0, 1\}$$ (84)

(85)

$$\phi_R[p] \rightarrow \phi_R + n\frac{\pi}{2},, n = \{-1, 0, 1\}$$ (86)

When doing the adaptive filtering, as described below, the processing adjusts the relative offsets associated with various frames. The transmitter array $67_T$ and the receiver array $67_R$ go through the calibration process in which the incident angles for the transmitter, namely $(\theta_T, \phi_T)$ and that of receiver, namely $(\theta_R, \phi_R)$ are identified.

While the previous example was described with reference to three-by-three phased antenna arrays $67_T$ and $67_R$, the examples illustrated in the FIGS. 14-20 are described with reference to four-by-four phased antenna arrays $67_T$ and $67_R$. As described in greater detail below, FIGS. 14-20 illustrate twenty-eight different array orientations that lead to twenty-eight different and unique measurements and/or equations. This is done by selecting a particular excitation vector for each of the transmitter array $67_T$ and receiver array $67_R$, e.g., 0°, 90°, -90°, etc., and alternatively activating the odd and even rows and/or columns of antennas $69_T$ and $69_R$ in the transmitter array $67_T$ and the receiver array $67_R$, respectively.

Figure 14:
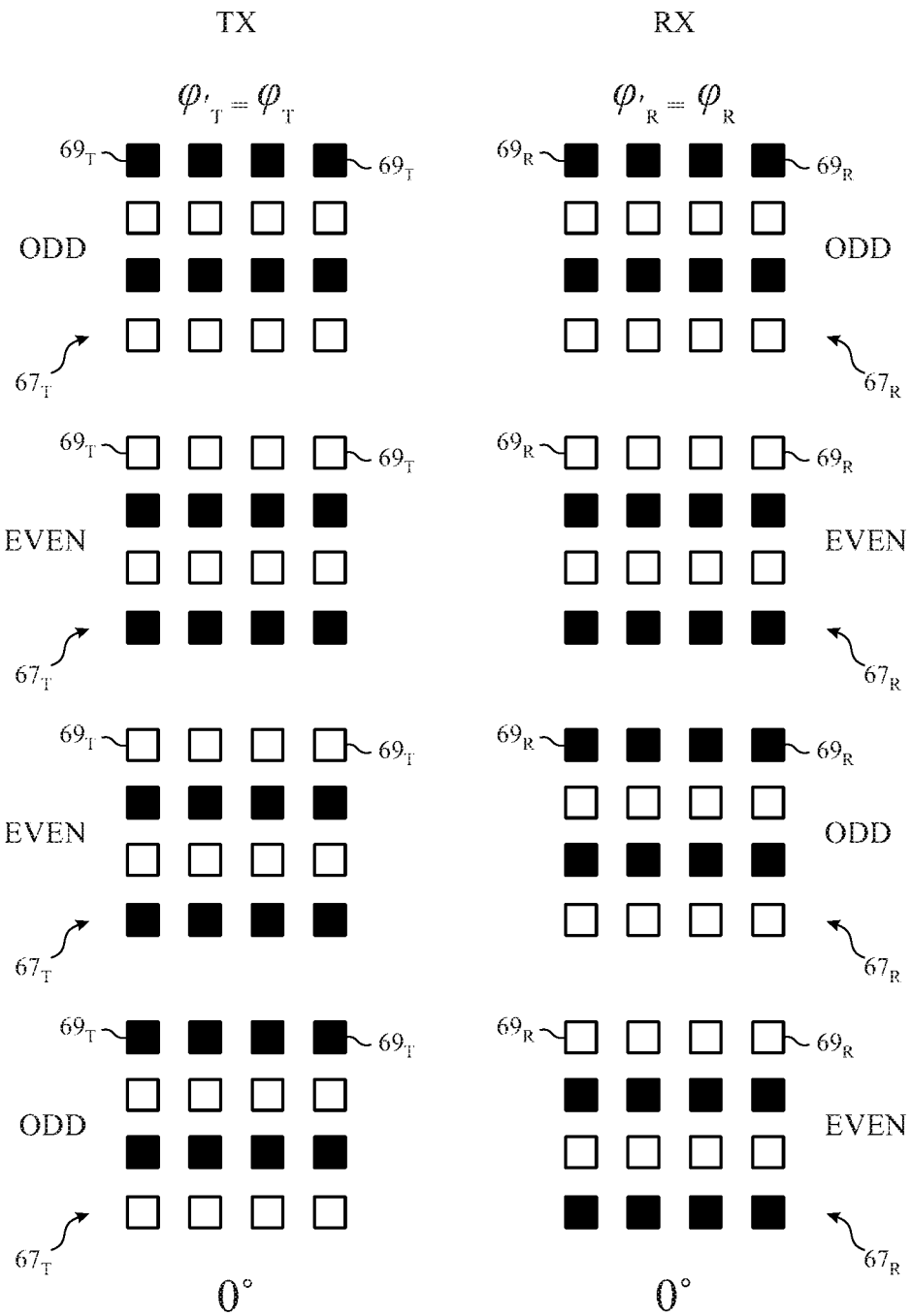
FIG. 14 illustrates a schematic diagram of two 4×4 transmission and reception phased antenna arrays showing successive odd and even activation of selected array elements at rotation angles of 0°, 0°.

As illustrated in FIG. 14, each of the arrays $67_T$ and $67_R$ are activated such that they each display an excitation vector of 0°. Over the course of four measurements, the antennas $69_T$ in the transmitter array $67_T$ are excited in odd rows, even rows, even rows, and odd rows, while over the course of the same four measurements the antennas $69_R$ in the receiver array $67_R$ are activated in odd rows, even rows, even rows, and odd rows.

Figure 15:
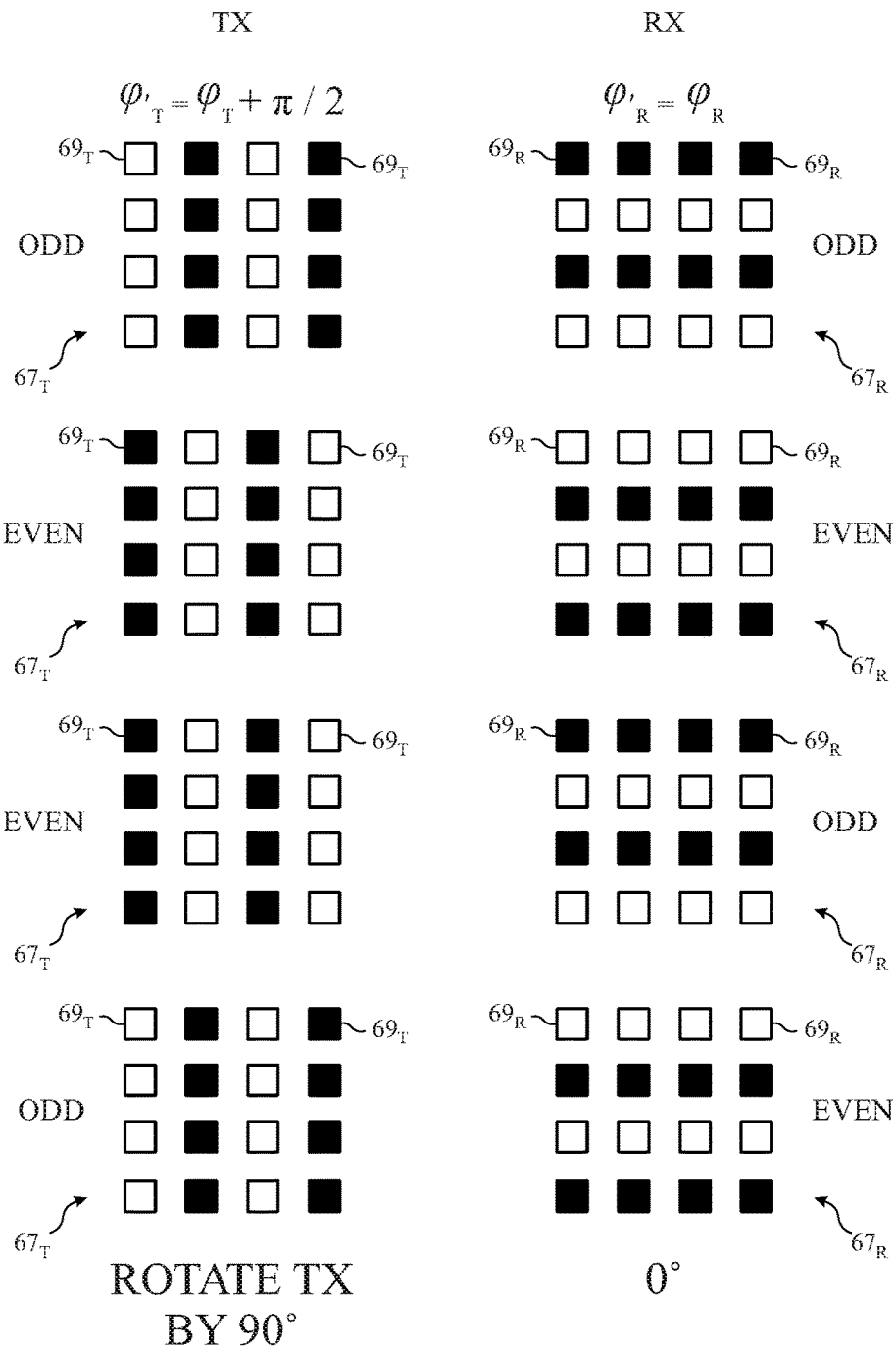
FIG. 15 illustrates a schematic diagram of two 4×4 transmission and reception phased antenna arrays showing successive odd and even activation of selected array elements at rotation angles of 90°, 0°.
Figure 16:
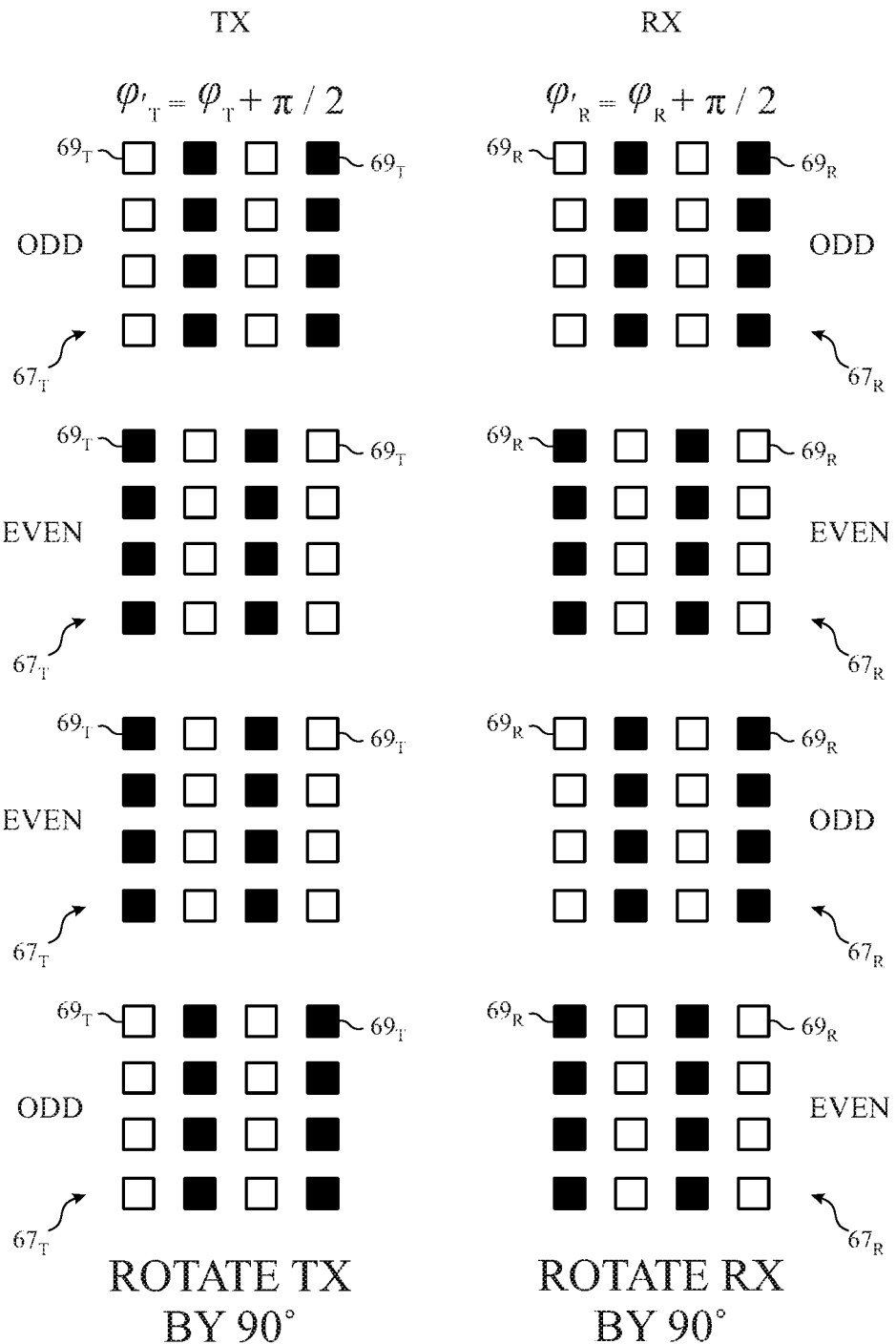
FIG. 16 illustrates a schematic diagram of two 4×4 transmission and reception phased antenna arrays showing successive odd and even activation of selected array elements at rotation angles of 90°, 90°.
Figure 17:
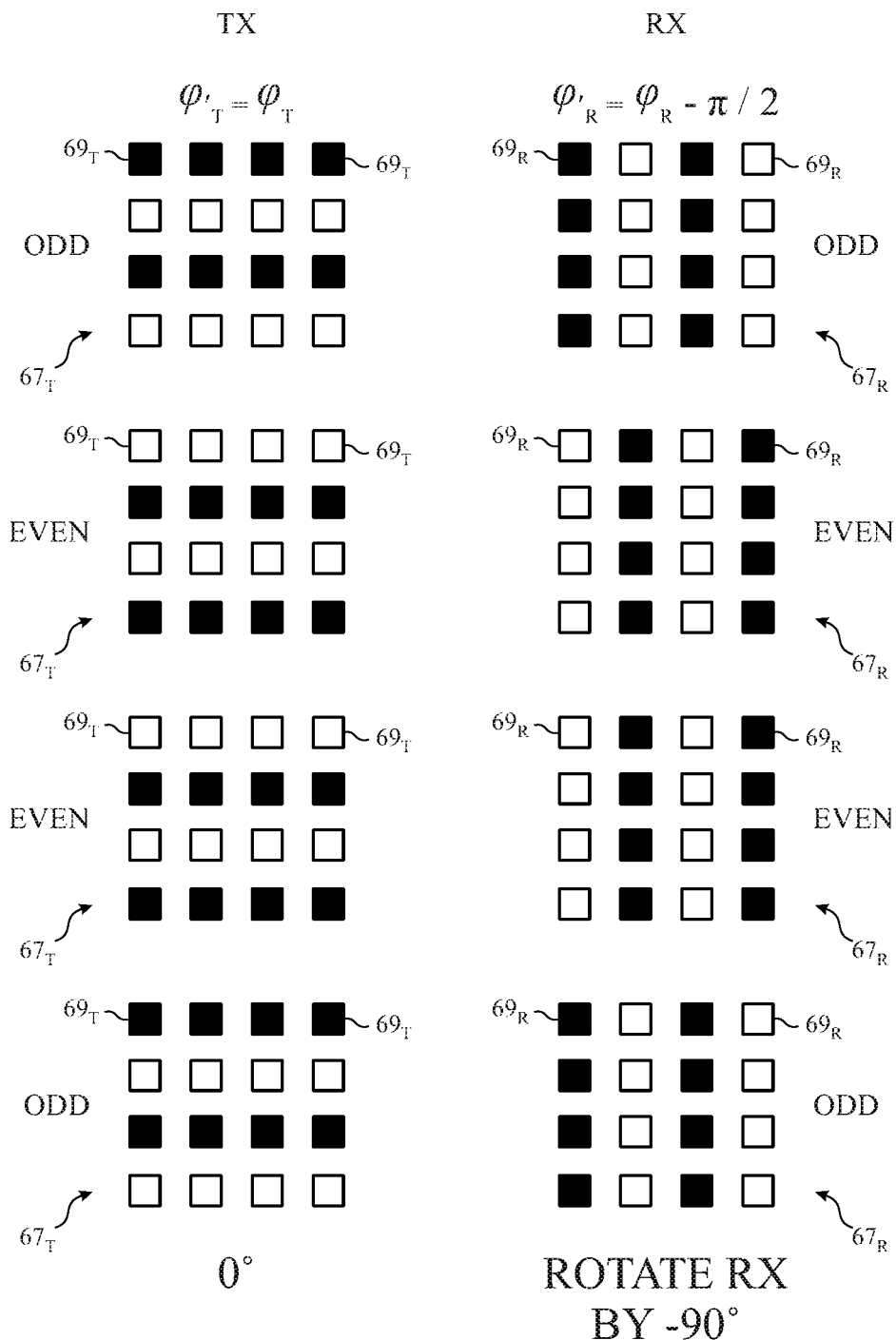
FIG. 17 illustrates a schematic diagram of two 4×4 transmission and reception phased antenna arrays showing successive odd and even activation of selected array elements at rotation angles of 0°, −90°.
Figure 18:
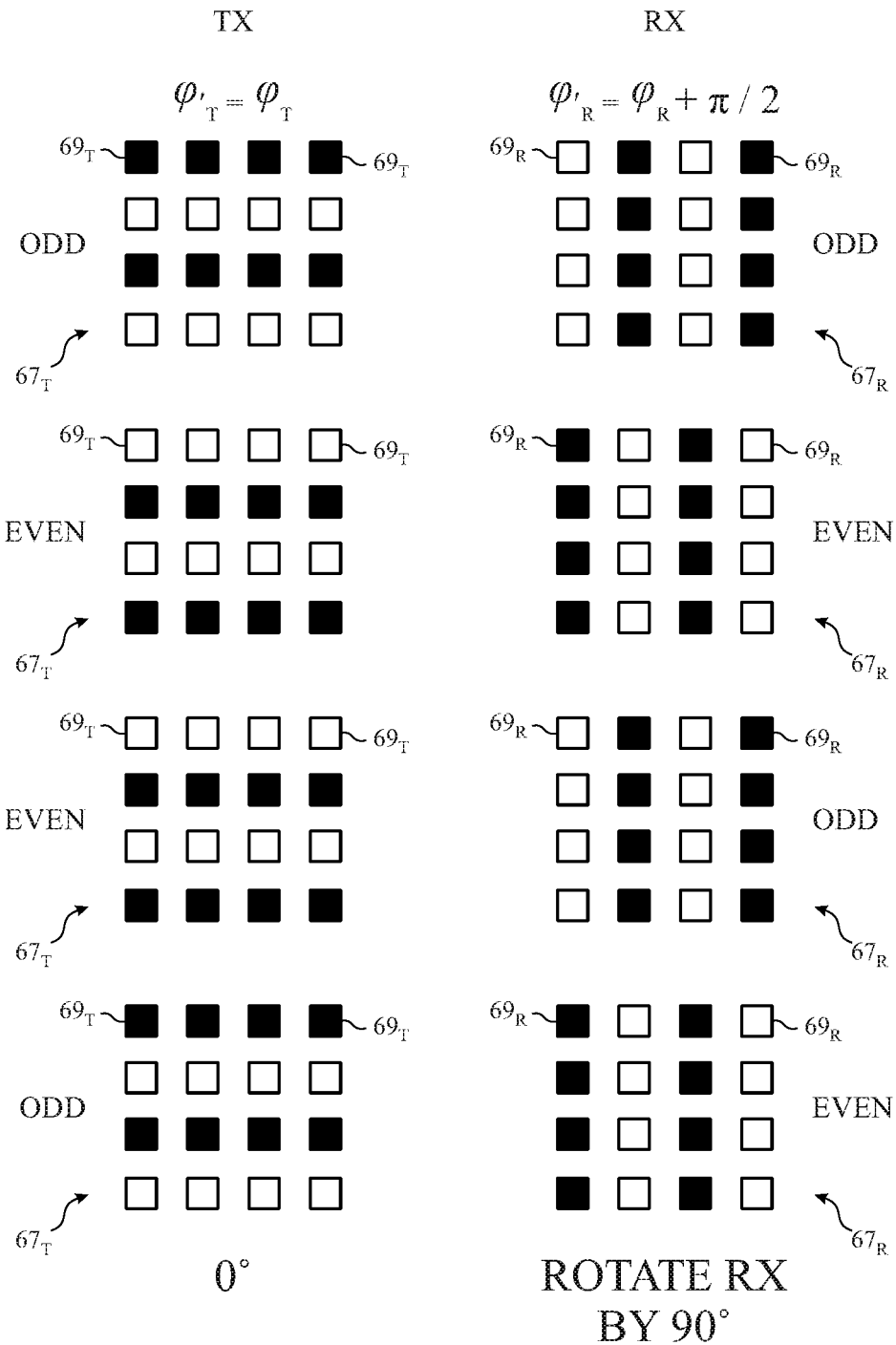
FIG. 18 illustrates a schematic diagram of two 4×4 transmission and reception phased antenna arrays showing successive odd and even activation of selected array elements at rotation angles of 0°, 90°.
Figure 19:
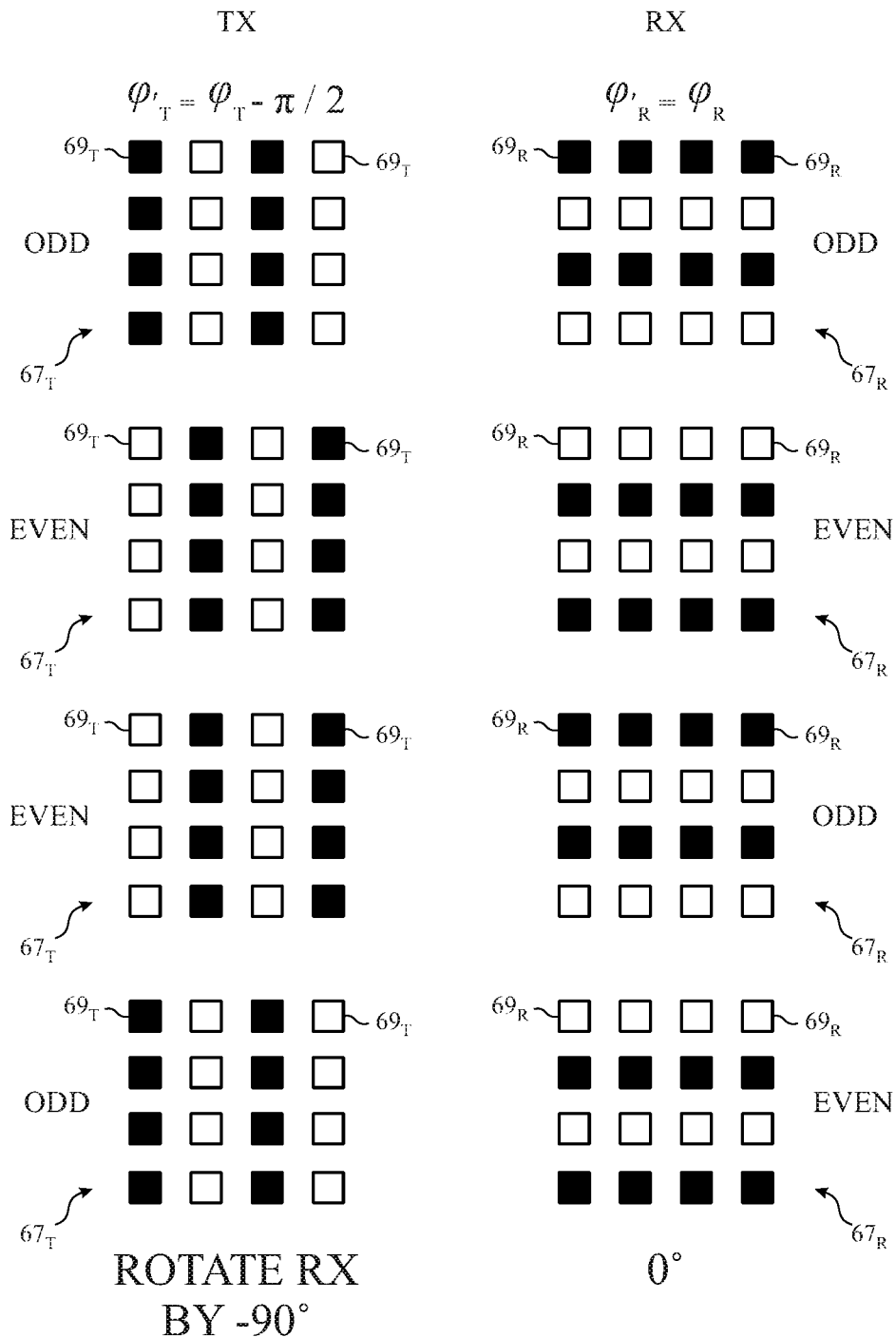
FIG. 19 illustrates a schematic diagram of two 4×4 transmission and reception phased antenna arrays showing successive odd and even activation of selected array elements at rotation angles of −90°, 0°.
Figure 20:
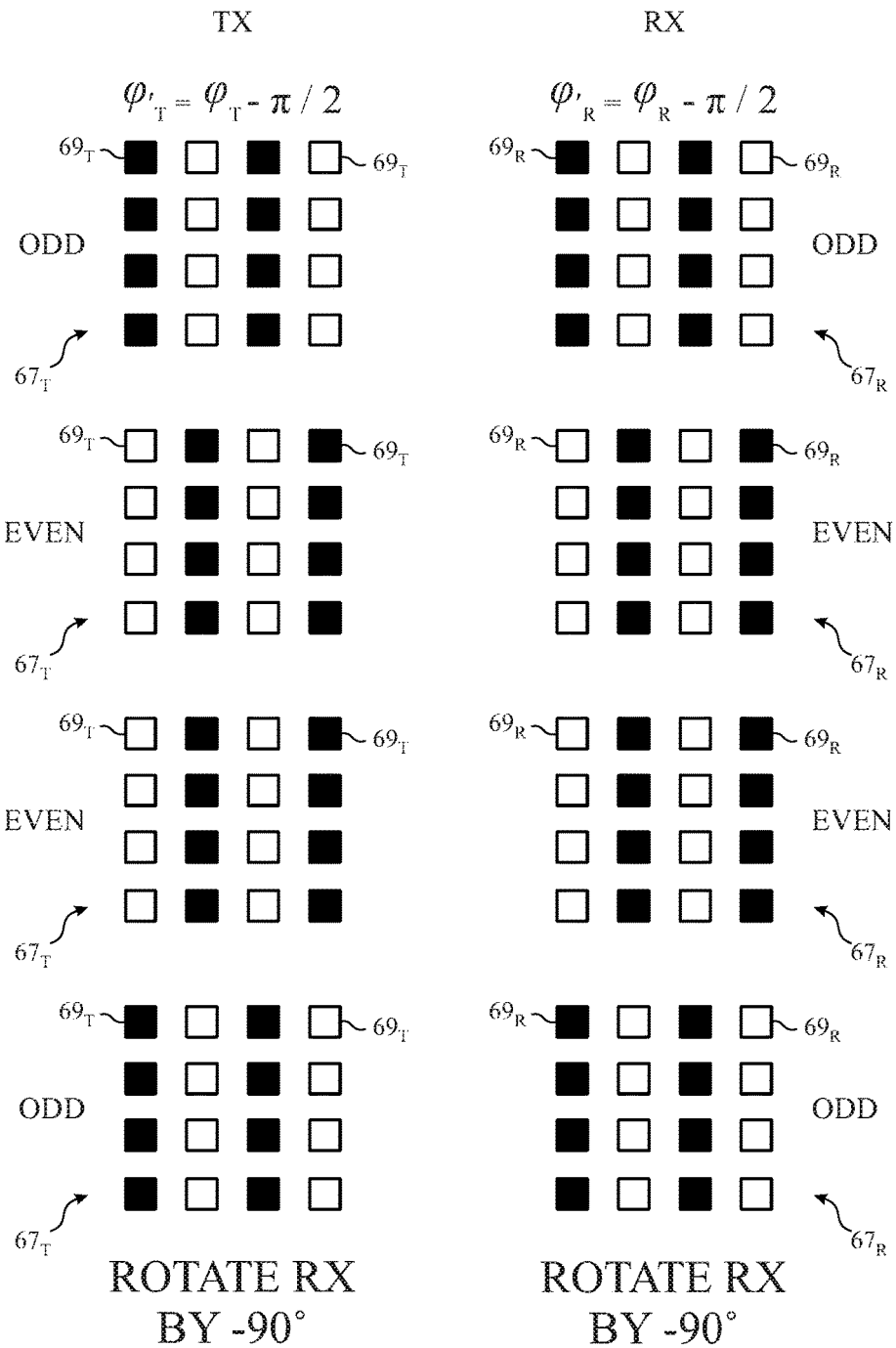
FIG. 20 illustrates a schematic diagram of two 4×4 transmission and reception phased antenna arrays showing successive odd and even activation of selected array elements at rotation angles of −90°, −90°.

Turning now to FIG. 15, it should be noted that the transmitter array $67_T$ has been effectively rotated by 90° because the antenna elements $69_T$ in the odd and even columns are being activated over the course of the four measurements rather than the antenna elements $69_T$ in the odd and even rows. It should also be noted that the receiver array $67_R$ has an excitation vector of 0° since its antennas $69_R$ are being excited in odd and even rows during the course of the four measurements. Similarly, FIG. 16 illustrates both the transmitter array $67_T$ and the receiver array $67_R$ having excitation vectors being rotated by 90°. The arrays $67_T$ and $67_R$ illustrated in FIG. 17 have excitation vectors effectively rotated by 0° and 90°, respectively. FIG. 18 illustrates the transmitter array $67_T$ having an excitation vector of 0°, while the receiver array $67_R$ has an excitation vector of 90°. FIG. 19 illustrates the transmitter array $67_T$ having an excitation vector of -90°, while the receiver array $67_R$ has an excitation vector of 0°. Finally, FIG. 20 illustrates that both the transmitter array $67_T$ and receiver array $67_R$ have excitation vectors of -90°.

Figure 21:
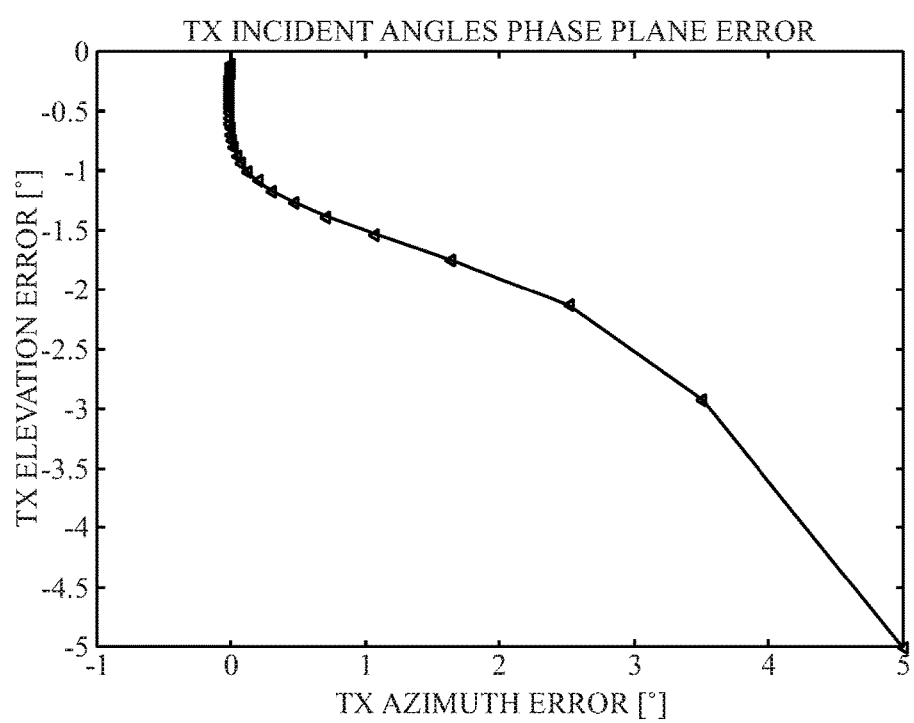
FIG. 21 illustrates a graph of transmission incidence angle phase plane error.
Figure 22:
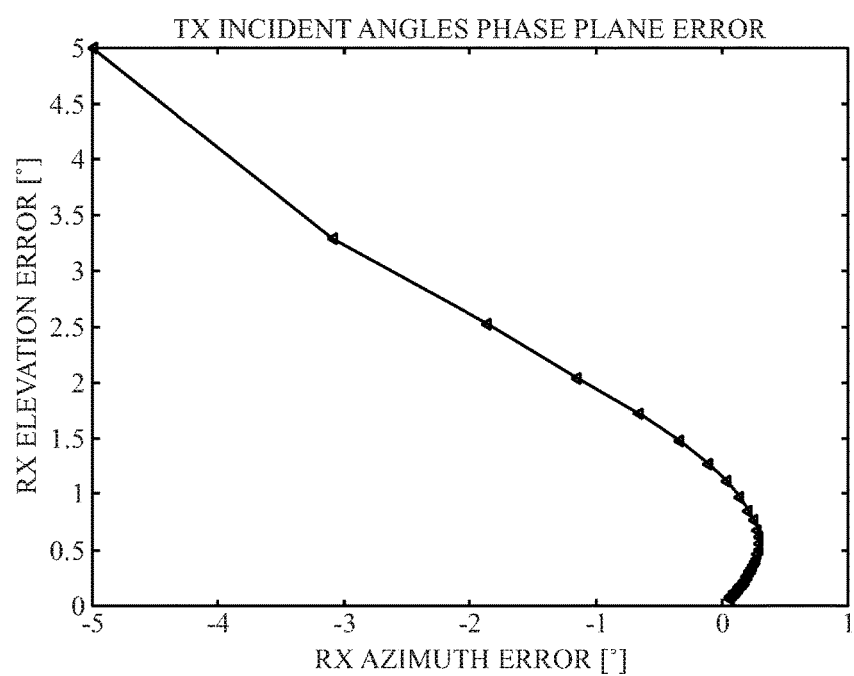
FIG. 22 illustrates a graph of reception incidence angle phase plane error.
Figure 23:
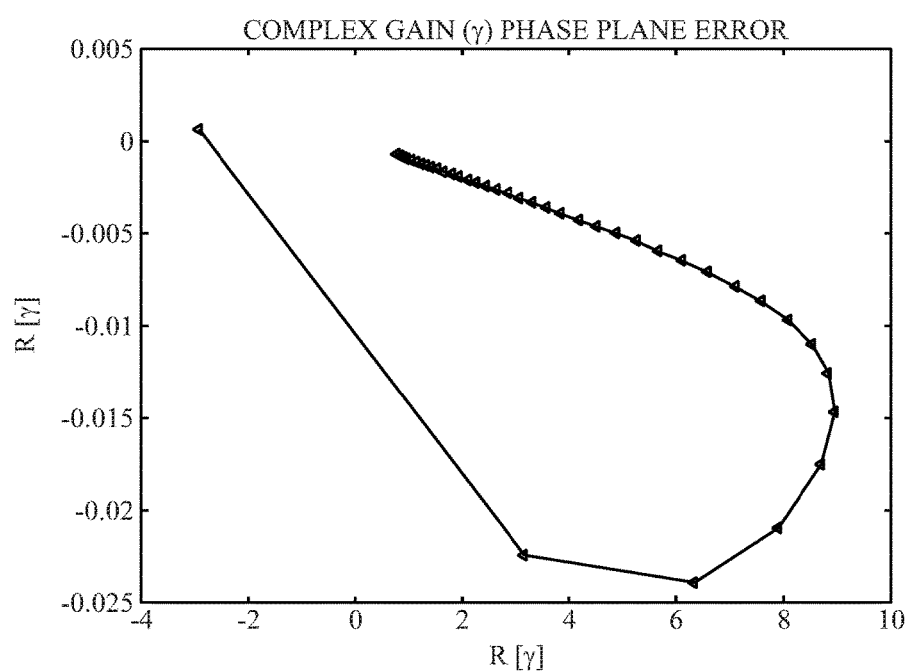
FIG. 23 illustrates a graph of complex gain phase plane error.

The measurements described above with respect to FIGS. 14-20 yield twenty-eight complex non-linear equations. By solving each of these equations in an iterative manner, e.g., by performing these measurements more than once and providing feedback, the error in the calculation of the incidence angles, e.g., elevation angle and azimuth angle, for both the transmitter array $67_T$ and the receiver array $67_R$ may be driven toward zero as illustrated in FIGS. 21-23. Once the zero crossing is found, then the six unknowns, e.g., $\phi_T$, $\theta_T$, $\phi_R$, $\theta_R$, as well as the complex numbers y for magnitude and phase of every transmission and arrival may be accurately determined.

Figure 24:
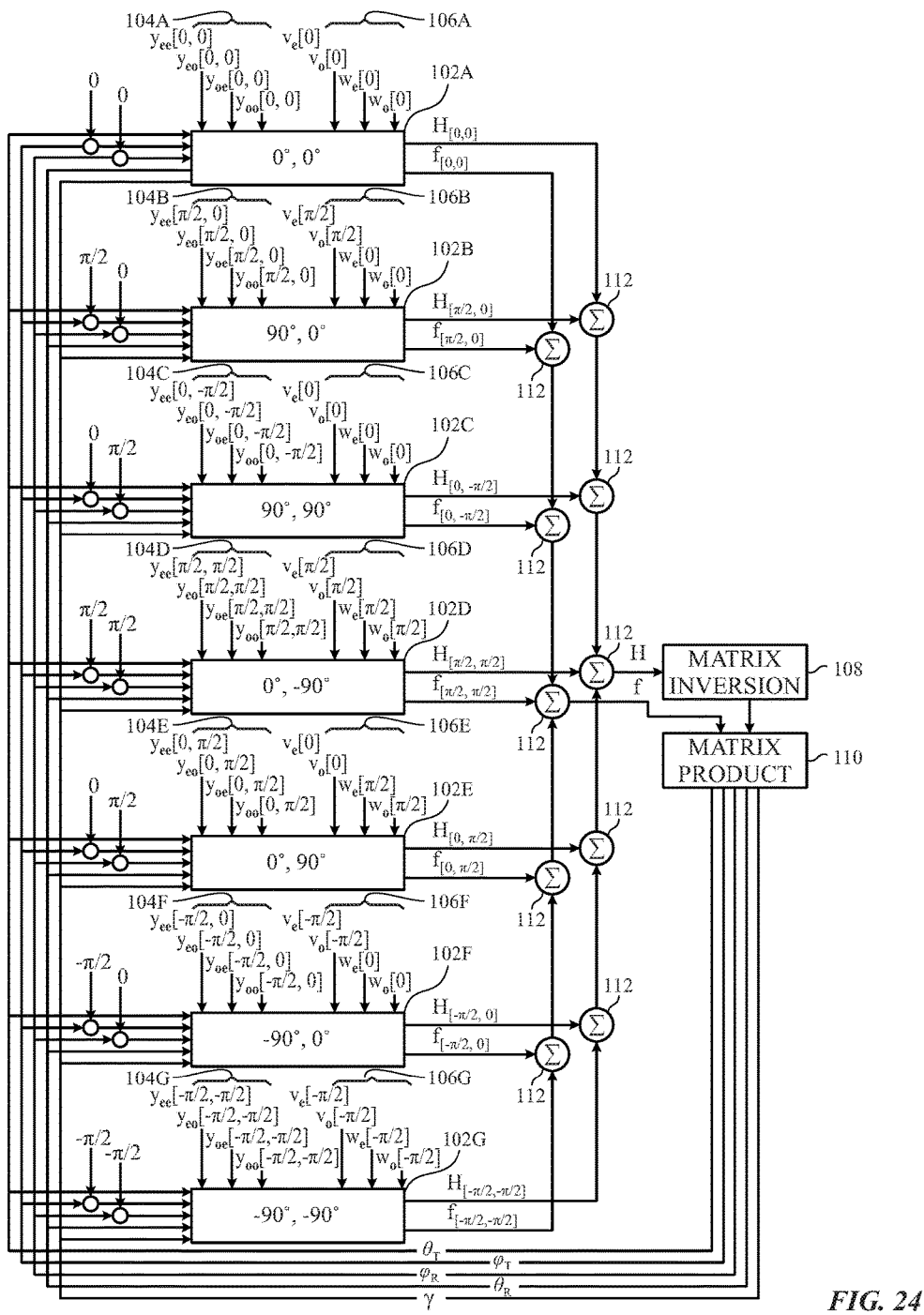
FIG. 24 is a schematic diagraph of an adaptive filter.

One technique for taking these measurements and providing such iterative determinations is illustrated in FIG. 24 as an adaptive filter 100. It should be understood that the adaptive filter 100 useful to perform this technique, as described below, may have some small amount of error, so the technique proceeds toward substantially zero error within the capabilities of the particular adaptive filter or other suitable device. Each of the seven types of measurements relating to the excitation vector of the arrays $67_T$ and $67_R$ may be performed by a respective filter block 102A-102G. Each of the filter blocks 102A-102G receive respective known coefficients used in each measurement 104A-104G, respectively, as well as observed values 106A-106G, respectively, for each measurement. The matrix inversion H is determined in block 108 (see, e.g., equation 79) and the function f is determined in the matrix product block 110 (see, e.g., equation 83). The output of the matrix product block 110 includes the incidence angles and complex numbers for the arrays $67_T$ and $67_R$ so that they may be fed back into the appropriate filter blocks 102A-102G for subsequent measurements. The results of each measurement are summed using the various respective summers 112, then fed back to the matrix inversion block 108 and the matrix product block 110 until a substantial zero crossing is found.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for determining incidence angles for a phased antenna array, the method comprising:
performing a first test by activating only a first subset of antennas in a transmitter phased antenna array and activating only a first subset of antennas in a receiver phased antenna array;
measuring incidence angles for the transmitter phased antenna array and for the receiver phased antenna array based on the first test;
performing a second test by activating only a second subset of antennas in the transmitter phased antenna array and activating only a second subset of antennas in the receiver phased antenna array;
measuring incidence angles for the transmitter phased antenna array and for the receiver phased antenna array based on the second test; and
repeating the first test and the second test until the incidence angles for the transmitter phased antenna array and for the receiver phased antenna array demonstrate substantially zero error.

2. The method, as set forth in claim 1, wherein performing the first test comprises activating all odd antennas in the transmitter phased antenna array and activating all odd antennas in the receiver phased antenna array, and wherein performing the second test comprises activating all even antennas in the transmitter phased antenna array and activating all even antennas in the receiver phased antenna array.

3. The method, as set forth in claim 1, wherein performing the first test comprises activating all odd antennas in the transmitter phased antenna array and activating all even antennas in the receiver phased antenna array, and wherein performing the second test comprises activating all even antennas in the transmitter phased antenna array and activating all odd antennas in the receiver phased antenna array.

4. The method, as set forth in claim 1, wherein the transmitter phased antenna array comprises an N-by-N array, and wherein the receiver phased antenna array comprises an N-by-N array, where N is an integer of 2 or greater.

5. The method, as set forth in claim 4, wherein performing the first test comprises activating all odd rows of antennas in the transmitter phased antenna array and activating all odd rows of antennas in the receiver phased antenna array, and wherein performing the second test comprises activating all even rows of antennas in the transmitter phased antenna array and activating all even rows of antennas in the receiver phased antenna array.

6. The method, as set forth in claim 4, wherein performing the first test comprises activating all odd rows of antennas in the transmitter phased antenna array and activating all even rows of antennas in the receiver phased antenna array, and wherein performing the second test comprises activating all even rows of antennas in the transmitter phased antenna array and activating all odd rows of antennas in the receiver phased antenna array.

7. The method, as set forth in claim 4, wherein performing the first test comprises activating all odd columns of antennas in the transmitter phased antenna array and activating all odd rows of antennas in the receiver phased antenna array, and wherein performing the second test comprises activating all even columns of antennas in the transmitter phased antenna array and activating all even rows of antennas in the receiver phased antenna array.

8. The method, as set forth in claim 4, wherein performing the first test comprises activating all odd columns of antennas in the transmitter phased antenna array and activating all even rows of antennas in the receiver phased antenna array, and wherein performing the second test comprises activating all even columns of antennas in the transmitter phased antenna array and activating all odd rows of antennas in the receiver phased antenna array.

9. The method, as set forth in claim 4, wherein performing the first test comprises activating all odd rows of antennas in the transmitter phased antenna array and activating all odd columns of antennas in the receiver phased antenna array, and wherein performing the second test comprises activating all even rows of antennas in the transmitter phased antenna array and activating all even columns of antennas in the receiver phased antenna array.

10. The method, as set forth in claim 4, wherein performing the first test comprises activating all odd rows of antennas in the transmitter phased antenna array and activating all even columns of antennas in the receiver phased antenna array, and wherein performing the second test comprises activating all even rows of antennas in the transmitter phased antenna array and activating all odd columns of antennas in the receiver phased antenna array.

11. An adaptive filter for determining incidence angles for a phased antenna array, the adaptive filter comprising:
a plurality of filter blocks, each respective filter block being adapted to measure incidence angles for a transmitter phased antenna array having a respective excitation vector and measure incidence angles for a receiver phased antenna array having a respective excitation vector, wherein each respective filter block is adapted to:
perform a first test by activating only a first subset of antennas in the transmitter phased antenna array and activating only a first subset of antennas in the receiver phased antenna array;
measure incidence angles for the transmitter phased antenna array and for the receiver phased antenna array based on the first test;
perform a second test by activating only a second subset of antennas in the transmitter phased antenna array and activating only a second subset of antennas in the receiver phased antenna array;
measure incidence angles for the transmitter phased antenna array and for the receiver phased antenna array based on the second test; and
repeat the first test and the second test until the incidence angles for the transmitter phased antenna array and for the receiver phased antenna array demonstrate zero error.

12. The adaptive filter, as set forth in claim 11, wherein performing the first test comprises activating all odd antennas in the transmitter phased antenna array and activating all odd antennas in the receiver phased antenna array, and wherein performing the second test comprises activating all even antennas in the transmitter phased antenna array and activating all even antennas in the receiver phased antenna array.

13. The adaptive filter, as set forth in claim 11, wherein performing the first test comprises activating all odd antennas in the transmitter phased antenna array and activating all even antennas in the receiver phased antenna array, and wherein performing the second test comprises activating all even antennas in the transmitter phased antenna array and activating all odd antennas in the receiver phased antenna array.

14. The adaptive filter, as set forth in claim 11, wherein the transmitter phased antenna array comprises an N-by-N array, and wherein the receiver phased antenna array comprises an N-by-N array, where N is an integer of 2 or greater.

15. The adaptive filter, as set forth in claim 14, wherein performing the first test comprises activating all odd rows of antennas in the transmitter phased antenna array and activating all odd rows of antennas in the receiver phased antenna array, and wherein performing the second test comprises activating all even rows of antennas in the transmitter phased antenna array and activating all even rows of antennas in the receiver phased antenna array.

16. The adaptive filter, as set forth in claim 14, wherein performing the first test comprises activating all odd rows of antennas in the transmitter phased antenna array and activating all even rows of antennas in the receiver phased antenna array, and wherein performing the second test comprises activating all even rows of antennas in the transmitter phased antenna array and activating all odd rows of antennas in the receiver phased antenna array.

17. The adaptive filter, as set forth in claim 14, wherein performing the first test comprises activating all odd columns of antennas in the transmitter phased antenna array and activating all odd rows of antennas in the receiver phased antenna array, and wherein performing the second test comprises activating all even columns of antennas in the transmitter phased antenna array and activating all even rows of antennas in the receiver phased antenna array.

18. The adaptive filter, as set forth in claim 14, wherein performing the first test comprises activating all odd columns of antennas in the transmitter phased antenna array and activating all even rows of antennas in the receiver phased antenna array, and wherein performing the second test comprises activating all even columns of antennas in the transmitter phased antenna array and activating all odd rows of antennas in the receiver phased antenna array.

19. The adaptive filter, as set forth in claim 14, wherein performing the first test comprises activating all odd rows of antennas in the transmitter phased antenna array and activating all odd columns of antennas in the receiver phased antenna array, and wherein performing the second test comprises activating all even rows of antennas in the transmitter phased antenna array and activating all even columns of antennas in the receiver phased antenna array.

20. The adaptive filter, as set forth in claim 14, wherein performing the first test comprises activating all odd rows of antennas in the transmitter phased antenna array and activating all even columns of antennas in the receiver phased antenna array, and wherein performing the second test comprises activating all even rows of antennas in the transmitter phased antenna array and activating all odd columns of antennas in the receiver phased antenna array.

* * * * *